United States Patent
Aiura

(10) Patent No.: US 9,853,540 B2
(45) Date of Patent: Dec. 26, 2017

(54) POWER SUPPLY CIRCUIT

(71) Applicant: Asahi Kasei Microdevices Corporation, Tokyo (JP)

(72) Inventor: Masami Aiura, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 338 days.

(21) Appl. No.: 14/023,858

(22) Filed: Sep. 11, 2013

(65) Prior Publication Data

US 2014/0092656 A1    Apr. 3, 2014

(30) Foreign Application Priority Data

Sep. 28, 2012 (JP) ................................. 2012-216188
Jun. 18, 2013 (JP) ................................. 2013-127818

(51) Int. Cl.
| | | |
|---|---|---|
| G05F 1/10 | (2006.01) | |
| G05F 3/02 | (2006.01) | |
| H02M 3/07 | (2006.01) | |
| H02M 3/158 | (2006.01) | |

(52) U.S. Cl.
CPC ............ H02M 3/07 (2013.01); H02M 3/158 (2013.01)

(58) Field of Classification Search
CPC ..................................................... H02M 3/07
USPC ................................................ 327/536–537
See application file for complete search history.

(56) References Cited

U.S. PATENT DOCUMENTS

| | | | |
|---|---|---|---|
| 6,392,462 B2 * | 5/2002 | Ebuchi ........................ | 327/115 |
| 7,126,595 B2 | 10/2006 | Yanagi et al. | |
| 2002/0095610 A1 * | 7/2002 | Nunomura ............. | G06F 1/3203 713/322 |
| 2003/0198311 A1 * | 10/2003 | Song ..................... | H03C 3/0925 375/376 |
| 2007/0257652 A1 * | 11/2007 | Yanagishima .......... | H02M 1/32 323/284 |
| 2009/0200956 A1 * | 8/2009 | Kojima .................. | H02M 3/073 315/291 |
| 2009/0224818 A1 * | 9/2009 | Yoneyama ............. | H02M 7/538 327/333 |

(Continued)

FOREIGN PATENT DOCUMENTS

| | | |
|---|---|---|
| JP | 58-175997 A | 10/1983 |
| JP | 62-38810 B2 | 8/1987 |

(Continued)

*Primary Examiner* — Lincoln Donovan
*Assistant Examiner* — Metasebia Retebo
(74) *Attorney, Agent, or Firm* — Morgan, Lewis & Bockius LLP

(57) ABSTRACT

A power supply circuit is intended to suppress power consumption when a load is not driven and to shorten a required time to be taken until a boosted voltage to be supplied to a high-side MOS transistor is stabilized when the load is changed from a deactivated state to an activated state.

The power supply circuit (power supply circuit 3) supplying power to a load driving circuit (motor driving circuit 2) that drives a load by controlling a high-side MOS transistor M1 on the basis of an input load control signal includes a booster circuit (charge pump 23) configured to boost a voltage of input power and supplies the power of which the voltage is boosted as power for driving the high-side MOS transistor. The booster circuit has power supply capability which varies depending on the load control signal.

16 Claims, 18 Drawing Sheets

(56) References Cited

U.S. PATENT DOCUMENTS

2010/0134177 A1* 6/2010 Hsu .................. H02M 3/073
                                                              327/536
2011/0140789 A1* 6/2011 Kumar .............. H03L 7/1972
                                                               331/18

FOREIGN PATENT DOCUMENTS

| JP | 01-312468 A | 12/1989 |
|----|-------------|---------|
| JP | 02-269497 A | 11/1990 |
| JP | 06-311731 A | 11/1994 |
| JP | 2002-123234 A | 4/2002 |
| JP | 2007-214647 A | 8/2007 |
| JP | 2009-240151 A | 10/2009 |

* cited by examiner

FIG. 2
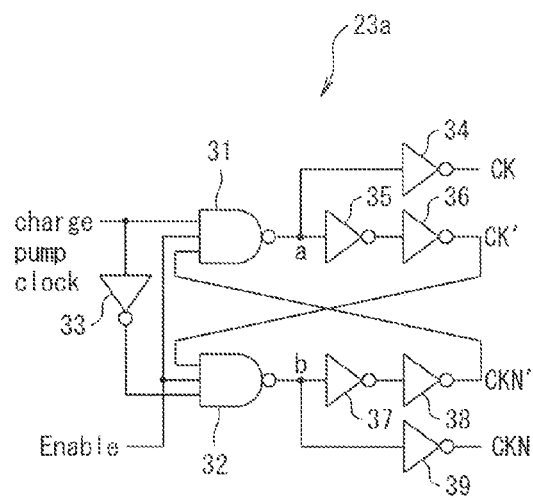
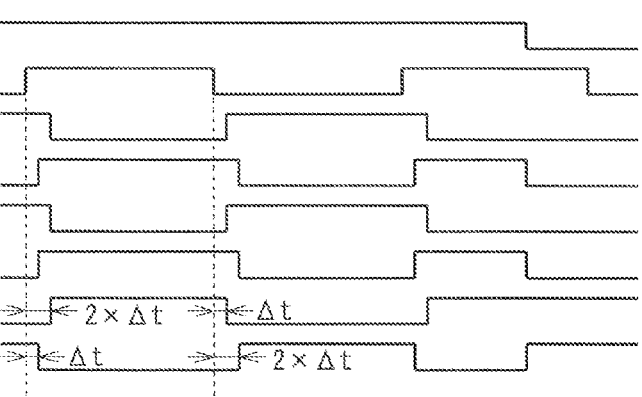
FIG. 3A Enable
FIG. 3B OSC
FIG. 3C a
FIG. 3D b
FIG. 3E CK'
FIG. 3F CKN'
FIG. 3G CK
FIG. 3H CKN

FIG. 13

| Timer | Timer<T1 | T1≤Timer<T2 | T2≤Timer<T3 | ...... | TN−1≤Timer<TN | TN≤Timer |
|---|---|---|---|---|---|---|
| Charge pump clock | clock1 | clock2 | clock3 | ...... | clockN | clock(N+1) |

F I G. 16

| Timer | Timer<T1 | T1≦Timer<T2 | T2≦Timer<T3 | ..... | TN-1≦Timer<TN | TN≦Timer |
|---|---|---|---|---|---|---|
| Charge pump clock | OSC/x1 | OSC/x2 | OSC/x3 | ..... | OSC/x(n) | OSC/x(n+1) |

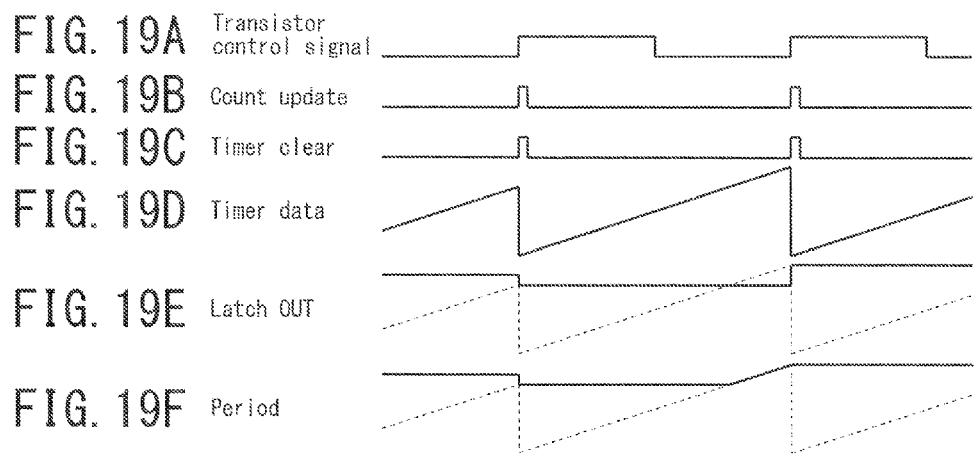
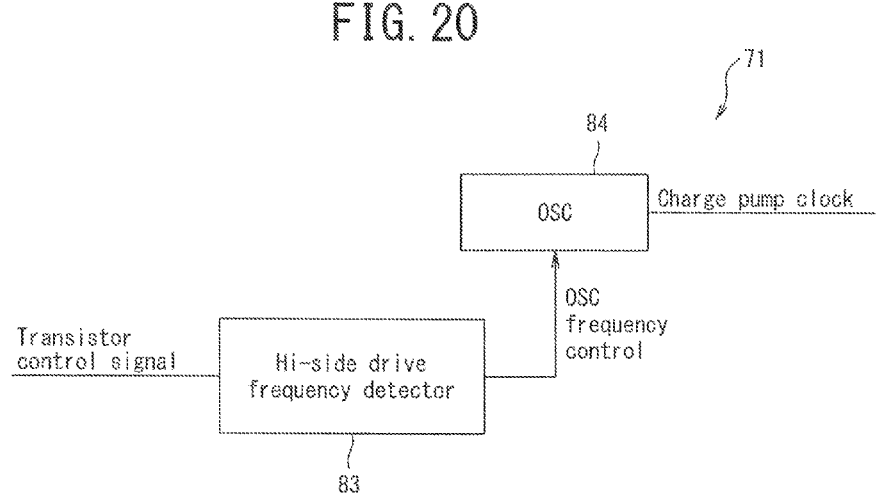

POWER SUPPLY CIRCUIT

TECHNICAL FIELD

The present invention relates to a power supply circuit that supplies a control voltage and the like for on-off control of transistors used in a DC power supply device such as a motor driver, a DC-DC converter, and a power supply coupler circuit.

BACKGROUND ART

A DC power supply device such as a motor driver, a DC-DC converter, and a power supply coupler circuit includes a high-side MOS transistor that converts an input voltage into an output voltage used to drive a load. As an example of such a DC power supply device including the high-side MOS transistor, a circuit has been proposed which generates an ON voltage for driving the high-side MOS transistor through a charging and boosting operation using a charge pump circuit and supplies the generated ON voltage (for example, see Patent Document 1).

Patent Document 1: JP 2007-214647 A

SUMMARY OF THE INVENTION

Problem to be Solved

However, in the circuit which generates the ON voltage for driving the high-side MOS transistor through a charging operation using the charge pump circuit as described above, the charge pump circuit is driven to supply the ON voltage to the high-side MOS transistor when a driving permission signal for driving a load is input, and the charge pump circuit is deactivated to stop the supply of the ON voltage when a driving permission signal for stopping the load is input.

The charge pump circuit is started up at the timing of the input of the driving permission signal for driving the load when a load non-driving state is switched to a load driving state, and thus the charging of a capacitor composing the charge pump circuit is started at that timing. Accordingly, there is a problem in that the ON voltage to be supplied to the high-side MOS transistor is not stabilized when the capacitor is being charged, and a time is taken until the ON voltage to be supplied to the high-side MOS transistor is stabilized.

Therefore, the present invention is made in consideration of the above-mentioned unsolved problem and an object thereof is to provide a power supply circuit which can shorten a required time to be taken until a control voltage for driving a high-side MOS transistor is stabilized.

Solution to the Problem

According to an aspect of the present invention, there is provided a power supply circuit (for example, a power supply circuit 3 shown in FIG. 1) supplying power to a load driving circuit (for example, a motor driving circuit 2 shown in FIG. 1) that drives a load by controlling a transistor (for example, a high-side MOS transistor M1 shown in FIG. 1) on the basis of an input load control signal, including: a booster circuit (for example, a charge pump 23 shown in FIG. 1) configured to boost a voltage of input power and supplies the power of which the voltage is boosted as power for driving the transistor, wherein the booster circuit has power supply capability which varies depending on the load control signal.

The power supply circuit may further include a power supply capability switching circuit (for example, an oscillation circuit 21 and a dividing circuit 22 shown in FIG. 1) configured to switch the power supply capability of the booster circuit depending on the load control signal.

The power supply capability switching circuit may be configured to switch the power supply capability so as to set the power supply capability to be lower when the load control signal indicates that an amount of power supplied to the load is smaller.

The power supply capability switching circuit may be configured to output a power-supply-capability-switching clock signal having a frequency corresponding to the load control signal, and the frequency of the power-supply-capability-switching clock signal may be lower when the load control signal indicates that the amount of power supplied to the load is smaller.

The power supply capability switching circuit (for example, an oscillation circuit 21 and a dividing circuit 22 shown in FIG. 1) may be configured to output a first clock signal of which the frequency is a first frequency as the power-supply-capability-switching clock signal when the load control signal is a load control signal indicating that the amount of power supplied to the load is equal to or more than a threshold value, and to output a second clock signal of which the frequency is a second frequency lower than the first frequency as the power-supply-capability-switching clock signal when the load control signal is a load control signal indicating that the amount of power supplied to the load is less than the threshold value.

The power supply capability switching circuit may include: an oscillation circuit (for example, an oscillation circuit 21 shown in FIG. 1) configured to generate a third clock signal; and a frequency converter circuit (for example, a dividing circuit 22 shown in FIG. 1) configured to convert the frequency of the third clock signal into the first frequency and the second frequency to generate the first clock signal and the second clock signal, and the frequency converter circuit may be configured to generate the first clock signal when the load control signal is a load control signal indicating that the amount of power supplied is equal to or more than the threshold value and to generate the second clock signal when the load control signal is a load control signal indicating that the amount of power supplied is less than the threshold value.

The power supply capability switching circuit may include: a first oscillation circuit (for example, a first oscillation circuit 51 shown in FIG. 9) configured to generate the first clock signal; a second oscillation circuit (for example, a second oscillation circuit 52 shown in FIG. 9) configured to generate the second clock signal; and a selection circuit (for example, a clock selection circuit 53 shown in FIG. 9) configured to select the first oscillation circuit to output the first clock signal when the load control signal is a load control signal indicating that the amount of power supplied is equal to or more than the threshold value, and to select the second oscillation circuit to output the second clock signal when the load control signal is a load control signal indicating that the amount of power supplied is less than the threshold value.

The threshold value may be zero.

The power supply capability switching circuit (for example, a clock controlling circuit 71 shown in FIG. 11) may include: an oscillation circuit (for example, an oscillation circuit 21 shown in FIG. 12) configured to generate a third clock signal; a divider (for example, a divider 74 shown in FIG. 12) configured to perform frequency-dividing the third clock signal at different dividing ratios to generate a plurality of clock signals having different frequencies; and a selection unit (for example, a selection switch 75 shown in FIG. 12) configured to select the clock signal having the frequency corresponding to the load control signal out of the plurality of clock signals generated by the divider as the power-supply-capability-switching clock signal, and the selection unit may be configured to select the clock signal having a lower frequency when the load control signal is a load control signal indicating that the amount of power supplied to the load is smaller.

The power supply capability switching circuit (for example, a clock controlling circuit 71 shown in FIG. 11) may include: an oscillation circuit (for example, an oscillation circuit 21 shown in FIG. 15) configured to generate a third clock signal; and a divider (for example, a divider 76 shown in FIG. 15) configured to perform frequency-dividing the third clock signal to generate the power-supply-capability-switching clock signal, and the divider may be configured to switch the dividing ratio to a dividing ratio for lowering the frequency when the load control signal is a load control signal indicating that the amount of power supplied to the load is smaller.

The booster circuit may be a charge pump circuit (for example, a charge pump 23 shown in FIG. 1) configured to boost the voltage of the input power depending on the power-supply-capability-switching clock signal.

Advantageous Effects of the Invention

According to the aspect of the present invention, the power supply capability of the booster circuit is variable depending on the load control signal for controlling the transistor for driving a load. Accordingly, for example, when the amount of power supplied to the load is small, it is possible to reduce the total power consumption of the power supply circuit by lowering the power supply capability. At this time, the booster circuit is not stopped. Accordingly, when the amount of power supplied to the load is changed from a small value to a large value, the operation in a state where the power supply capability is high is started at the state where the voltage is boosted in advance by the booster circuit. As a result, it is possible to rapidly stabilize the power for driving a transistor, i.e., to rapidly supply the stabilized power for driving a transistor by changing the power supply capability to a large value.

BRIEF DESCRIPTION OF THE DRAWINGS

FIG. 2 is a configuration diagram illustrating an example of a clock generating unit.

FIGS. 3A to 3H are timing diagrams illustrating examples of signals at the parts of the clock generating unit.

FIG. 13 is a diagram illustrating a relationship between a timer output and a clock signal.

FIG. 16 is a diagram illustrating a relationship between a timer output and a dividing ratio.

FIGS. 19A to 19F are timing diagrams illustrating examples of signals at the parts of the drive pattern frequency meter.

FIG. 20 is a schematic configuration diagram illustrating another example of the clock controlling circuit.

DESCRIPTION OF EMBODIMENTS

Hereinafter, embodiments of the present invention will be described with reference to the accompanying drawings.

First, a first embodiment will be described below.

First Embodiment

Figure 1:
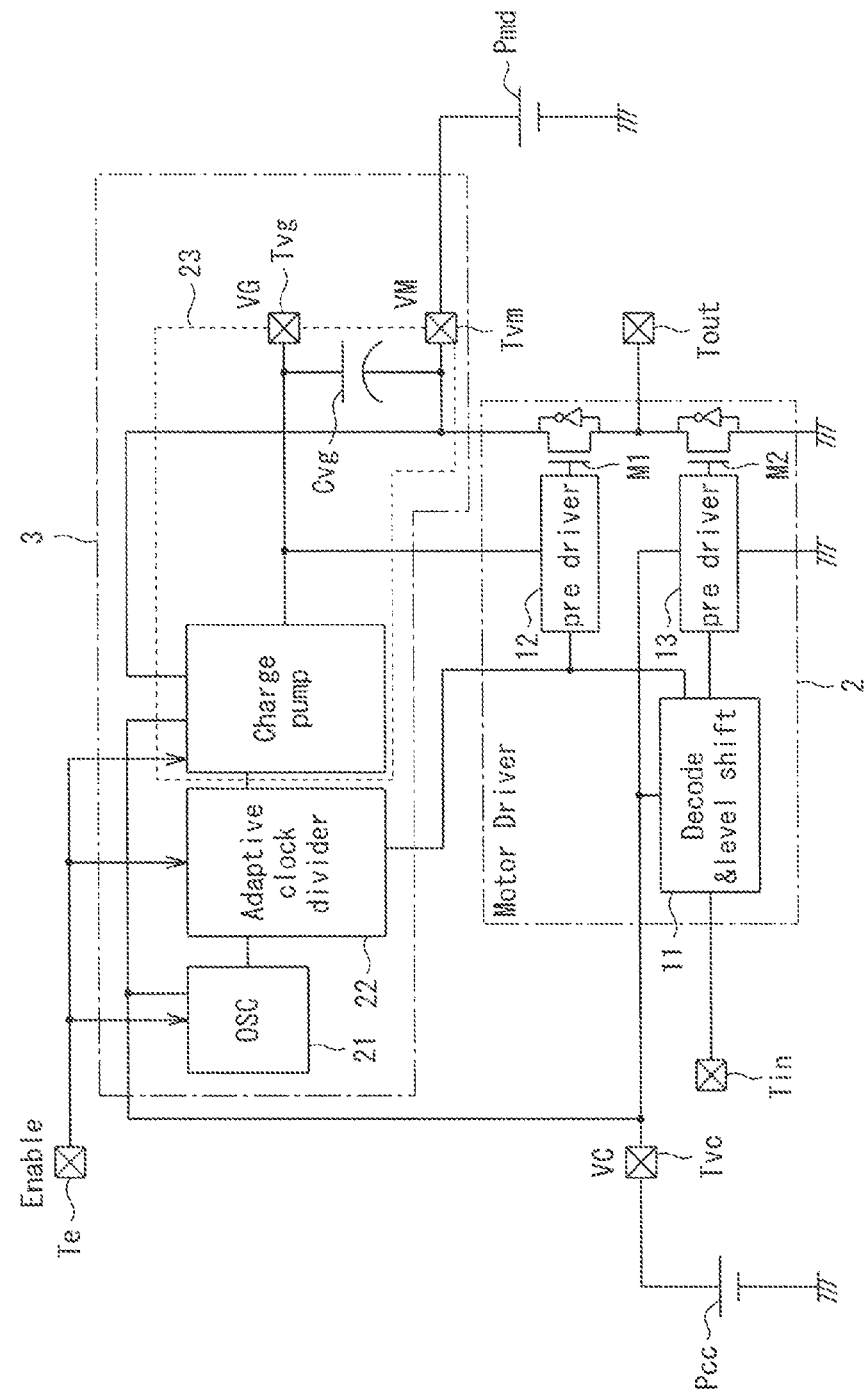
FIG. 1 is a schematic configuration diagram illustrating an example of a DC power supply device employing a power supply circuit according to the present invention.

FIG. 1 is a schematic configuration diagram illustrating an example of a DC power supply device 1 employing a power supply circuit according to the present invention.

The DC power supply device 1 shown in FIG. 1 is a motor driver and includes a motor driving circuit (Motor Driver) 2 and a power supply circuit 3.

The motor driving circuit 2 includes, for example, a decode/level shift circuit (decode & level shift) 11, a high-side MOS transistor M1 formed of a MOS transistor, a low-side MOS transistor M2 connected in series to the high-side MOS transistor M1, and pre-drivers 12 and 13 supplying a gate voltage to the high-side MOS transistor M1 and the low-side MOS transistor M2. In each of the high-side MOS transistor M1 and the low-side MOS transistor M2, a body diode is formed in anti-parallel.

The high-side MOS transistor M1 and the low-side MOS transistor M2 connected in series are connected between a power source terminal Tvm and a ground voltage. The power source terminal Tvm is grounded via a power source Pmd for the motor driving circuit 2.

The connection portion between the high-side MOS transistor M1 and the low-side MOS transistor M2 is connected to an output terminal Tout outputting a motor driving signal. A motor as a load is connected to the output terminal Tout. FIG. 1 shows an example where a single-phase motor is used as the load.

The decode/level shift circuit 11 and the pre-driver 13 driving the low-side MOS transistor M2 are connected to a power source terminal Tvc. The power source terminal Tvc is grounded via a power source Pcc for a circuit performing various controls in the DC power supply device 1. On the other hand, the pre-driver 12 is connected to a power source terminal Tvg.

The decode/level shift circuit 11 receives an input of a motor control signal of a pulse width or a pulse number corresponding to a rotation amount of the motor from a control input terminal Tin, performs a decoding and level-shifting process and a buffering process on the motor control signal, generates a transistor control signal for controlling the MOS transistors M1 and M2, and outputs the generated transistor control signal to the pre-drivers 12 and 13.

The pre-drivers 12 and 13 generate a gate drive signal for complementarily driving the high-side MOS transistor M1 and the low-side MOS transistor M2 in response to the transistor control signal from the decode/level shift circuit 11, and supply the generated gate drive signal to the gates of the high-side MOS transistor M1 and the low-side MOS transistor M2. Accordingly, the high-side MOS transistor M1 and the low-side MOS transistor M2 are complementarily driven and the voltage between the high-side MOS transistor M1 and the low-side MOS transistor M2 is supplied as a motor driving signal from the output terminal Tout to a motor not shown.

The power supply circuit 3 includes an oscillation circuit (OSC) 21, a dividing circuit 22, and a charge pump 23. The oscillation circuit 21, the dividing circuit (Adaptive clock divider) 22, and the charge pump 23 are connected to an enable input terminal Te, receives an enable signal (Enable) via the enable input terminal Te from a higher-level device not shown, and performs a boosting operation in response to a charge-pump clock signal to be described later when the enable signal is an enable signal indicating that the DC power supply device 1 should be switched to a driving state. The oscillation circuit 21 and the charge pump 23 are connected to a power source Pcc for a circuit performing various controls in the DC power supply device 1 via a power source terminal Tvc.

The enable signal is a signal which is turned on when the DC power supply device 1 is in a driving state and which is turned off when the DC power supply device is in a non-driving state.

The oscillation circuit 21 generates a clock signal and outputs the generated clock signal to the dividing circuit 22.

The dividing circuit 22 receives the clock signal from the oscillation circuit 21 and the transistor control signal for the high-side MOS transistor M1 supplied to the pre-driver 12 from the decode/level shift circuit 11, determines whether the transistor control signal has a drive pattern for supplying high power to the motor on the basis of the transistor control signal for the pre-driver 12, performs frequency-dividing the clock signal into either of a relatively-high first frequency or a second frequency lower than the first frequency depending on the determination result, and outputs the frequency-divided clock signal as a clock signal (hereinafter, a charge-pump clock signal (Charge pump clock)) for the charge pump to the charge pump 23.

The charge pump 23 includes a clock generating unit 23a and a charge pump circuit 23b. In FIG. 1, the charge pump 23 is conceptually illustrated. The configurations of the clock generating unit 23a and the charge pump circuit 23b will be described later.

The clock generating unit 23a receives the charge-pump clock signal from the dividing circuit 22 and generates four non-overlap signals from the received charge-pump clock signal. The charge pump circuit 23b boosts the terminal voltage VM (i.e. input voltage) of the power source terminal Tvm and a terminal voltage VC (i.e. input voltage) of the power source terminal Tvc on the basis of the non-overlap signal generated by the clock generating unit 23a and generates a boosted voltage VG.

FIG. 2 is a schematic configuration diagram illustrating an example of the clock generating unit 23a.

As shown in FIG. 2, the clock generating unit 23a includes two NAND circuits 31 and 32. The NAND circuit 31 receives the charge-pump clock signal from the dividing circuit 22, the enable signal, and a clock signal CKN' to be described later, calculates a logical OR thereof, and outputs an inverted signal thereof. The NAND circuit 32 receives an inverted output obtained by inverting the charge-pump clock signal from the dividing circuit 22 by the use of an inverter 33, the enable signal, and a clock signal CK' to be described later, calculates a logical OR thereof, and outputs an inverted signal thereof.

A signal obtained by inverting the output of the NAND circuit 31 by the use of an inverter 34 is the clock signal CK, a signal obtained by inverting the output of the NAND circuit 31 by the use of inverters 35 and 36 is the clock signal CK', a signal obtained by inverting the output of the NAND circuit 32 by the use of inverters 37 and 38 is the clock signal CKN', and a signal obtained by inverting the output of the NAND circuit 32 by the use of an inverter 39 is the clock signal CKN. A non-overlap signal varying at the timings shown in FIGS. 3E to 3H are generated by adjusting time constants of circuits constituting the clock generating unit 23a shown in FIG. 2 and adjusting delay times in the circuits.

FIGS. 3A to 3H are timing diagrams illustrating the clock signals, where FIG. 3A shows an enable signal (Enable), FIG. 3B shows a charge-pump clock signal (Charge pump clock) generated from the output of the oscillation circuit (OSC) 21, FIG. 3C shows the voltage of an output terminal a of the NAND circuit 31, FIG. 3D shows the voltage of an output terminal b of the NAND circuit 32, FIG. 3E shows the clock signal CK', FIG. 3F shows the clock signal CKN', FIG. 3G shows the clock signal CK, and FIG. 3H shows the clock signal CKN. As shown in FIGS. 3A to 3H, the clock signal CK is a signal obtained by delaying a rising edge of the charge-pump clock signal from the dividing circuit 22 by a constant time $2 \times \Delta t$ and delaying a falling edge thereof by a constant time $\Delta t$, and the clock signal CK' is an inverted signal of the clock signal CK. The clock signal CKN is a signal obtained by delaying the rising edge of the charge-pump clock signal by a constant time $\Delta t$, delaying the falling edge thereof by a constant time $2 \times \Delta t$, and inverting the resultant signal, and the clock signal CKN' is the inverted signal of the clock signal CKN.

The configuration of the clock generating unit 23a is not limited to the configuration shown in FIG. 2, and may have any circuit configuration as long as four types of non-overlap signals CK, CK', CKN, and CKN' can be generated from the clock signal output from the dividing circuit 22 as shown in FIGS. 3A to 3H.

Figure 4:
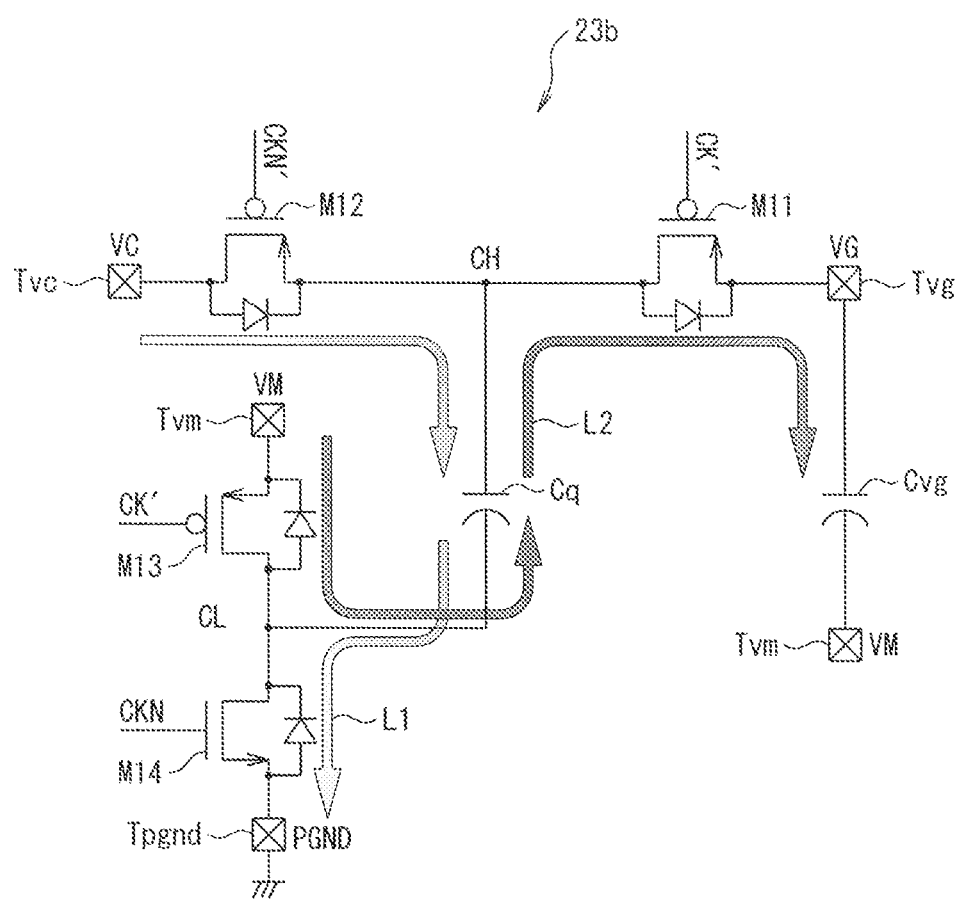
FIG. 4 is a configuration diagram illustrating an example of a charge pump.
Figure 5:
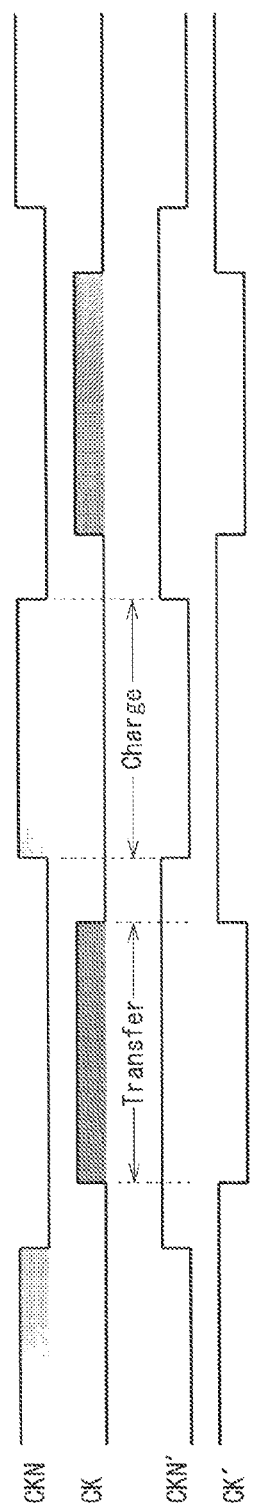
FIGS. 5A to 5D are timing diagrams illustrating an operation of the charge pump.

FIG. 4 is a circuit diagram illustrating an example of the charge pump circuit 23b.

As shown in FIG. 4, the charge pump circuit 23b includes MOS transistors M11 and M12 which are P-channel MOS transistors connected in series between the power source terminal Tvg and the power source terminal Tvc, a MOS transistor M13 which is a P-channel MOS transistor and a MOS transistor M14 which is an N-channel MOS transistor, which are connected in series between the power source terminal Tvm and the ground terminal Tpgnd, a capacitor Cq connected between a connection point CH of the MOS transistors M11 and M12 and a connection point CL of the MOS transistors M13 and M14, and a capacitor Cvg connected between the power source terminal Tvg and the power source terminal Tvm.

The non-overlap signals generated by the clock generating unit 23a are input to the gates of the MOS transistors M11 to M14. Specifically, the clock signal CK' is input to the gate of the MOS transistor M11, the clock signal CKN' is input to the gate of the MOS transistor M12, the clock signal CK is input to the gate of the MOS transistor M13, and the clock signal CKN is input to the gate of the MOS transistor M14. The configuration of the charge pump circuit 23b is not limited to the configuration shown in FIG. 4, and may have any configuration as long as it can boost the voltage of input power depending on the clock signals.

The operation of the charge pump 23 will be described below with reference to FIGS. 4 and 5A to 5D.

In the charge pump circuit 23b, as shown in FIG. 4, a path L1 including the power source terminal Tvc, the MOS transistor M12, the capacitor Cq, the MOS transistor M14, and the ground terminal Tpgnd is formed by turning on the MOS transistors M12 and M14 and turning off the MOS transistors M11 and M13, and thus the capacitor Cq is charged.

When the MOS transistors M11 and M13 are turned on and the MOS transistors M12 and M14 are turned off in this state, a path L2 including the power source terminal Tvm, the MOS transistor M13, the capacitor Cq, the MOS transistor M11, the power source terminal Tvg, the capacitor Cvg, and the power source terminal Tvm is formed, the charges of the capacitor Cq are transferred to the capacitor Cvg, and thus the voltage VG of the power source terminal Tvg rises.

That is, as shown in FIGS. 5A to 5D, the capacitor Cq is charged in a period when the clock signal CKN (FIG. 5A) is at a high level, and the charges of the capacitor Cq are transferred to the capacitor Cvg in a period when the clock signal CK (FIG. 5B) is at a high level.

In this configuration, the voltage VG of the power source terminal Tvg is supplied as a source voltage to the pre-driver 12 and is supplied as a gate driving voltage to the gate terminal of the high-side MOS transistor M1 via the pre-driver 12. Accordingly, the high-side MOS transistor M1 is driven with a relatively-high voltage boosted by the charge pump 23, and ON resistance of the high-side MOS transistor M1 decreases as a result. By decreasing the ON resistance, the power loss in the high-side MOS transistor M1 is reduced. The low-side MOS transistor M2 is driven with a low voltage and a voltage of a level equivalent to that of the transistor control signal input from the decode/level shift circuit 11 can be used as the gate driving voltage thereof. In this embodiment, the clock signal CK' is directly input to the gate of the MOS transistor M13, but may be input via a level shifter. By using the level shifter, a MOS transistor with a relatively-low breakdown voltage can be constructed.

Figure 6:
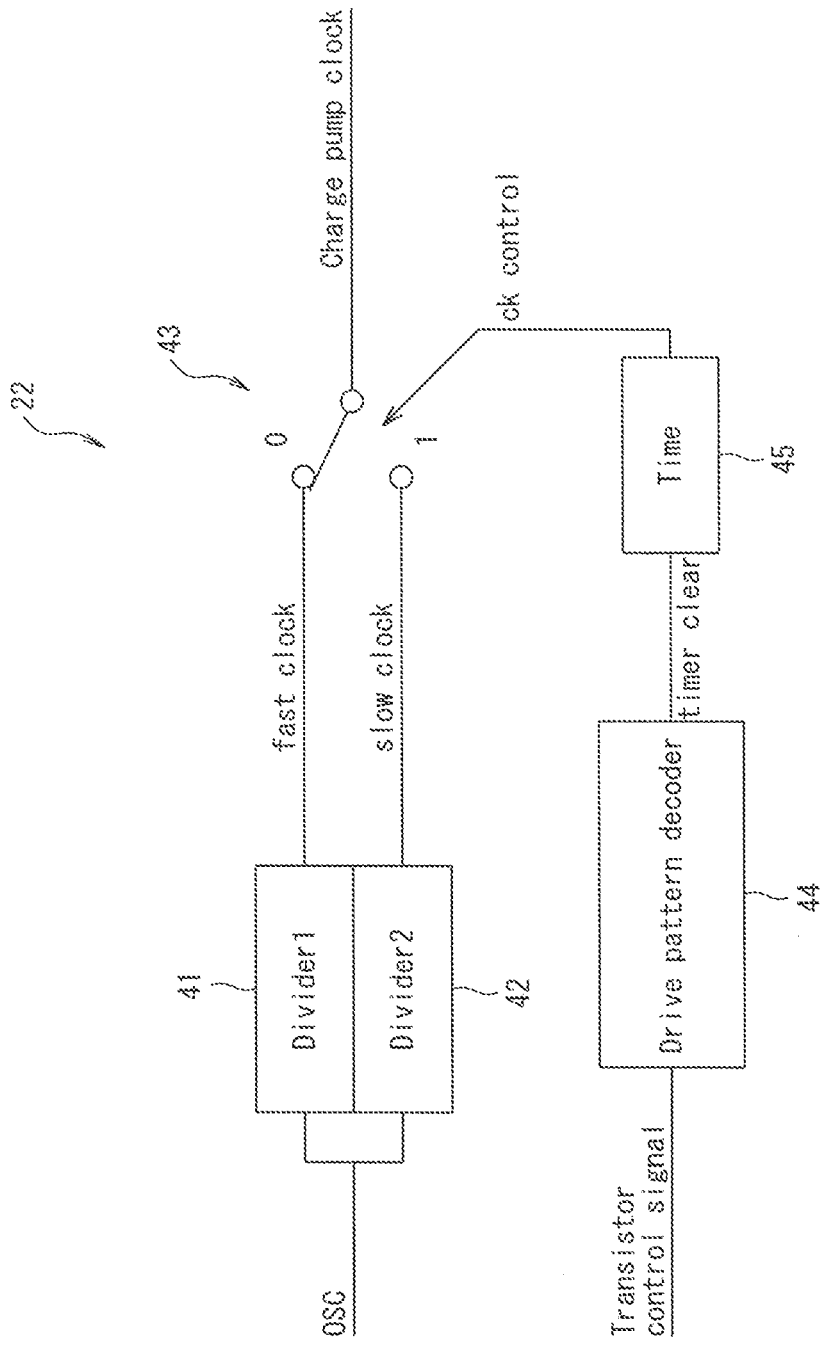
FIG. 6 is a schematic configuration diagram illustrating an example of a dividing circuit.

FIG. 6 is a schematic configuration diagram illustrating an example of the dividing circuit 22.

The dividing circuit 22 includes a first divider (Divider1) 41 that performs frequency-dividing a clock signal from the oscillation circuit 21 into signals (fast clock) of a relatively-high frequency, a second divider (Divider2) 42 that performs frequency-dividing the clock signal from the oscillation circuit 21 into a signal (slow clock) of a frequency lower than that of the first divider 41, a selection switch 43 that selects output of either of the first divider 41 or the second divider 42 and supplies the selected output as a charge-pump clock signal to the charge pump 23, a drive pattern decoder 44 that receives the transistor control signal for the pre-driver 12 from the decode/level shift circuit 11, performs a decoding and level-shifting process on the received transistor control signal, and determines whether the transistor control signal for driving the high-side MOS transistor M1 has a drive pattern for supplying high power to the motor, and a timer 45.

The selection switch 43 switches a selection destination using the output signal of the timer 45 as a clock control signal (ck control). Specifically, the selection switch 43 selects the output signal (fast clock) of the first divider 41 with a higher frequency when the output signal of the timer 45 is at a low level and selects the output signal (slow clock) of the second divider 42 with a lower frequency when the output signal of the timer 45 is at a high level.

The drive pattern decoder 44 determines whether the transistor control signal for the pre-driver 12 has the drive pattern for supplying high power to the motor, i.e., whether the pulse width thereof is large, or whether the number of pulses per unit time is large. For example, when the pulse width is equal to or more than a threshold value or when the number of pulses per unit time is equal to or more than a threshold value, the drive pattern decoder 44 determines that the transistor control signal has the drive pattern for supplying high power to the motor. On the contrary, when the pulse width is less than the threshold value or when the number of pulses per unit time is less than the threshold value, the drive pattern decoder 44 determines that the transistor control signal has a drive pattern for supplying low power to the motor.

The drive pattern decoder 44 outputs a high-level signal when the transistor control signal has the pattern for supplying high power, and outputs a low-level signal when the transistor control signal has the pattern for supplying low power.

The timer 45 counts the elapsed time and outputs a high-level signal when a predetermined time elapses. The output signal of the drive pattern decoder 44 is used as a timer clear signal. That is, the timer 45 is reset when the output signal of the drive pattern decoder 44 is at a high level. That is, the timer 45 counts, for example, a period in which the output signal of the drive pattern decoder 44 is at a low level, and outputs the high-level signal when the period in which the output signal is at a low level reaches a predetermined upper limit of the timer 45.

By employing this configuration, the transistor control signal is hardly at a high level when the power to be supplied to the motor is small. Accordingly, the output signal of the drive pattern decoder 44 is hardly at a high level, i.e., the timer 45 is hardly reset. Therefore, since the output signal of the timer 45 is hardly at a low level, the selection switch 43 often selects the output of the second divider 42, i.e., a frequency-divided signal of a low frequency. When the motor is not driven, the transistor control signal is not at a high level. Accordingly, the output signal of the timer 45 holds the high level after a predetermined time corresponding to the upper limit elapses, and the timer 45 is not reset. Therefore, the frequency-divided signal of a low frequency is selected.

On the other hand, when the power to be supplied to the motor is large, the transistor control signal is frequently at a high level, the output signal of the drive pattern decoder 44 is frequently at a high level, and thus the number of times in which the timer 45 is reset increases. That is, since the timer 45 is reset before the predetermined time corresponding to the upper limit elapses, the output signal of the timer 45 holds the low level and a frequency-divided signal of a high frequency is selected.

The operations in the first embodiment will be described below.

Figure 7:
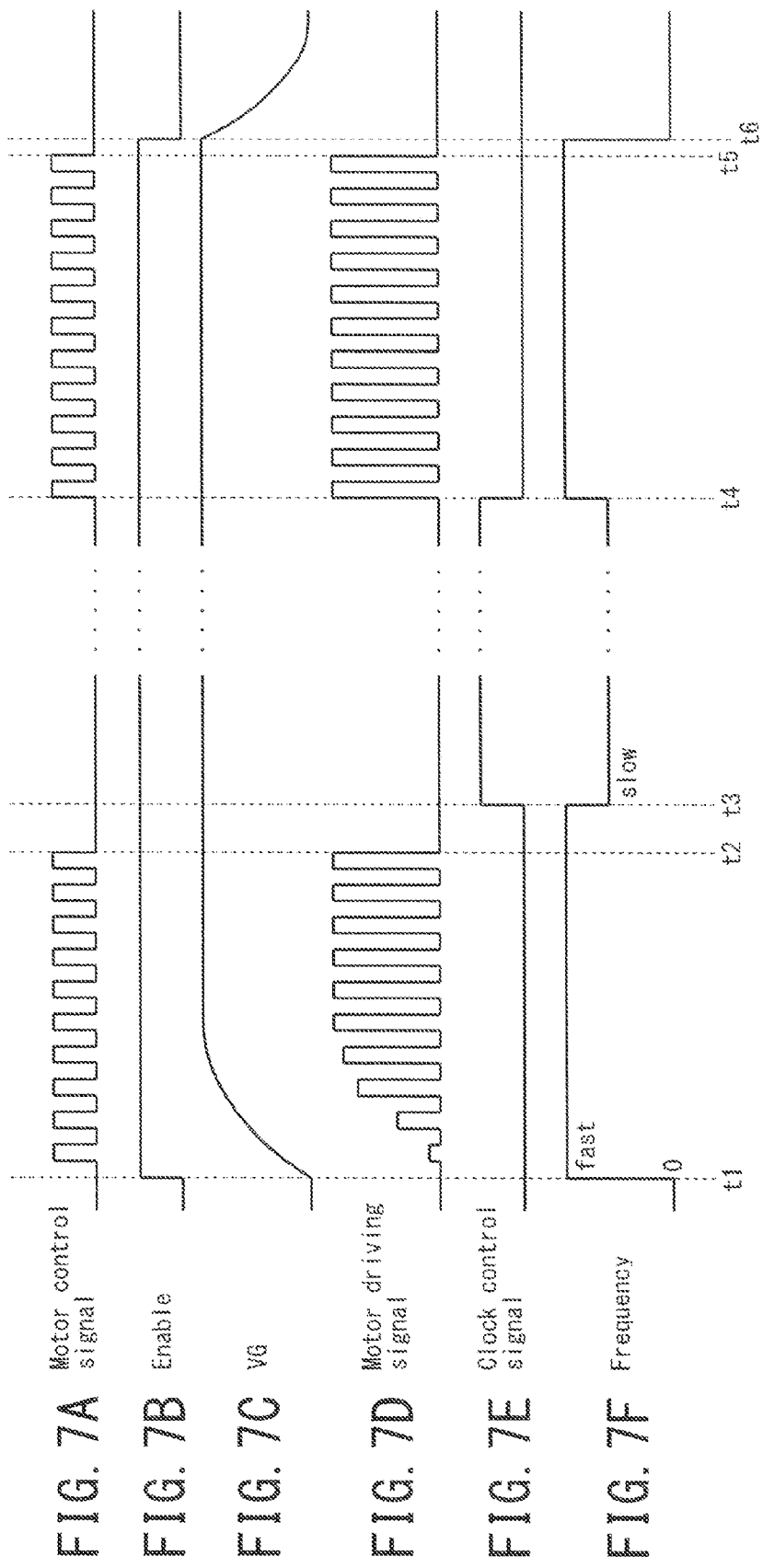
FIGS. 7A to 7F are timing diagrams illustrating examples of signals at the parts of a DC power supply device according to a first embodiment and is provided for describing operations in the present invention.
Figure 8:
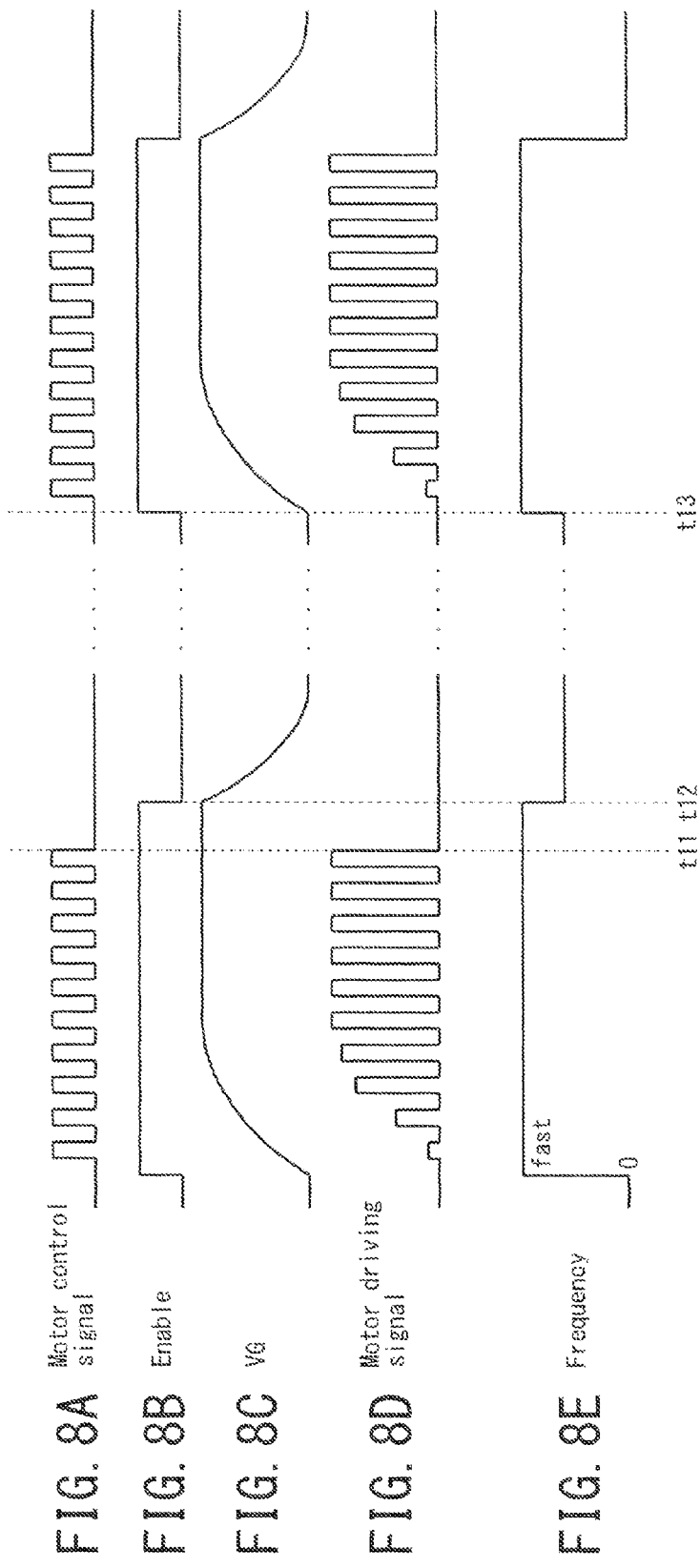
FIGS. 8A to 8E are timing diagrams illustrating examples of signals at the parts of a conventional DC power supply device.

FIGS. 7A to 7F are timing diagrams illustrating the signals at the parts of the DC power supply device 1 in FIG. 1, where FIG. 7A shows the motor control signal including a pulse signal corresponding to the rotation amount of the motor, FIG. 7B shows the enable signal, FIG. 7C shows the voltage VG of the power source terminal Tvg, FIG. 7D shows the motor drive signal output from the output terminal Tout, FIG. 7E shows the clock control signal output from the timer 45, and FIG. 7F shows the frequency level of the clock signal supplied to the charge pump 23.

A higher-level device not shown outputs a high-level enable signal when the DC power supply device 1 is driven. By driving the motor, the higher-level device outputs a motor control signal with a pulse width corresponding to the power supplied to the motor (timing t1).

In the motor driving circuit 2, the decode/level shift circuit 11 decodes the motor control signal, performs a level-shifting and buffering process, and generates and outputs the drive control signal for the pre-drivers 12 and 13.

Since the drive pattern decoder 44 determines that the drive control signal has a pattern for supplying high power to the motor, the output signal of the drive pattern decoder 44 is frequently at a high level, the timer 45 is frequently reset, and thus the clock control signal holds the low level. As a result, a clock signal of a higher frequency from the first divider 41 is selected as the charge-pump clock signal.

At this time, in the power supply circuit 3, since a high-frequency clock signal is supplied as the charge-pump clock signal from the dividing circuit 22, the clock generating unit 23a generates four non-overlap signals from the high-frequency clock signal and the charge pump circuit 23b is driven on the basis of the non-overlap signals. Accordingly, with an increase in the voltage VG of the power source terminal Tvg, the ON resistance of the high-side MOS transistor M1 decreases and the motor drive signal including the pulse signals increases in amplitude gradually. At this time, since the charge pump 23 is driven on the basis of the high-frequency clock signal, the voltage VG of the power source terminal Tvg is rapidly boosted and stabilized.

When the motor control signal from the higher-level device holds the low level and no pulse is generated so as to deactivate the motor from this state (timing t2), the driver control signal output from the decode/level shift circuit 11 for use in the pre-driver 12 holds the low level. Since the drive pattern decoder 44 determines that the drive control signal has the pattern for supplying low power to the motor, the output signal of the drive pattern decoder 44 holds the low level. Accordingly, the output signal of the timer 45, i.e., the clock control signal, is changed to a high level at timing t3 at which the counted value reaches the upper limit, the output signal of the second divider 42 which has a low frequency is selected by the selection switch 43, and the selected output signal is output as the charge-pump clock signal.

Accordingly, the operating frequency of the charge pump 23 is lowered but the voltage VG of the power source terminal Tvg is increased. Since the charge pump 23 operates at a lower frequency, i.e., at a slower frequency, but the motor control signal from the higher-level device is a signal for deactivating the motor, the pre-drivers 12 and 13 are not driven. That is, the gate drive voltage is not supplied to the high-side MOS transistor M1. Accordingly, even when the charge pump 23 is driven at a low frequency, the voltage VG of the power source terminal Tvg is maintained as a constant voltage.

When the motor is driven again in this state, the motor control signal with the pulse number corresponding to the rotation amount of the motor is output from the higher-level device (timing t4), and the drive control signal for driving the motor is output to the pre-driver 12. Accordingly, since the output signal of the drive pattern decoder 44 of the dividing circuit 22 is frequently at a high level and the timer 45 is frequently reset, the output signal of the timer 45 holds the low level. As a result, the high-frequency clock signal from the first divider 41 is selected and is output as the charge-pump clock signal by the selection switch 43.

In the power supply circuit 3, the voltage VG of the power source terminal Tvg is supplied as the gate drive voltage of the high-side MOS transistor M1 at timing t4 at which the motor control signal for driving the motor is input, but the voltage VG of the power source terminal Tvg is stabilized already at timing t4. Accordingly, at the timing at which the motor control signal for driving the motor is input, the high-side MOS transistor M1 can be rapidly fully driven, i.e., the motor drive signal with a stable amplitude can be supplied thereto.

When the drive pattern decoder 44 detects that the signal has the pattern for supplying high power to the motor, the output signal is switched to a high level, and the timer 45 is reset and the clock control signal is switched to a low level at the timing at which the output signal is switched to the high level. Accordingly, at the timing at which the drive pattern decoder 44 detects that the signal has the pattern for supplying high power to the motor, the charge-pump clock signal can be switched to the high-frequency clock signal and the boosting operation can be rapidly started at the same time as starting the supply of the motor drive signal to the motor, thereby satisfactorily stabilizing the motor drive signal.

In this state, when the input of the motor control signal from the higher-level device is stopped at timing t5 and the enable signal is switched to the low level at timing t6, the dividing circuit 22 stops its operation and thus the capacitor Cvg is discharged, thereby lowering the voltage VG of the power source terminal Tvg.

In this way, in the DC power supply device 1, the enable signal is turned on when activating the DC power supply device 1 and the enable signal is turned off when deactivating the DC power supply device. Instead of activating and deactivating the charge pump 23 depending on the enable signal, the charge pump 23 is driven depending on the charge-pump clock signal when the enable signal is turned on, i.e., the charge pump 23 is driven depending on the charge-pump clock signal when the enable signal is turned on without depending on whether the motor is driven. At this time, when it is necessary to supply high power to the motor on the basis of the pattern of the transistor control signal for driving the high-side MOS transistor M1 of the motor driving circuit 2, the boosting operation is sufficiently performed by raising the frequency of the charge-pump clock signal to raise the boosting capability, i.e., the voltage supply capability, of the charge pump 23. On the contrary, when it is not necessary to supply high power to the motor, the minimum supply capability is achieved by lowering the frequency of the charge-pump clock signal to lower the boosting capability, i.e., the voltage supply capability, of the charge pump 23.

As a result, it is possible to shorten the time taken until the boosted voltage supplied to the high-side MOS transistor M1 is stabilized after the state in which the motor is not driven is changed to the state in which the motor is driven, while suppressing the power consumption when the motor is not driven.

The power consumption in the state in which the motor is not driven is suppressed by switching the charge pump 23 to the activated state without depending on whether the motor is driven and switching the frequency of the charge-pump clock signal depending on whether the motor is driven. Therefore, particularly, when this embodiment is applied to the DC power supply device 1 that supplies a voltage to a motor or the like of which the activation and deactivation are frequently repeated, the power consumption is suppressed in the state where the motor is not driven, and a sufficient voltage can be supplied rapidly in the state where the motor is driven, which is effective. This embodiment can be suitably applied to a motor which is intermittently driven, such as a motor used to adjust a lens of a digital camera and a motor of an electrically power assisted bicycle. Since a sufficient voltage can be rapidly supplied in the state where the motor is driven, both of the rapid supply of a voltage in the state where the motor is driven and the decrease of the power consumption in the state where the motor is not driven can be achieved. Therefore, it is possible to improve usability of a motor or the like which is driven with a battery and thus to extend the lifetime of the battery, which is suitable.

FIGS. 8A to 8E are timing diagrams illustrating waveforms of signals at the parts in the DC power supply device 1 shown in FIG. 1, when the charge pump 23 is stopped at the time of deactivating the motor.

As shown in FIGS. 8A to 8E, in the conventional DC power supply device 1, a higher-level device outputs an enable signal of a high level and outputs a motor control signal when the motor is driven, and the charge pump 23 is stopped when the motor control signal is switched to a low level at timing t11 and the enable signal is switched to a low level at timing t12. Accordingly, the capacitor Cvg is discharged and thus the voltage VG of the power source terminal Tvg is slowly lowered from timing t12.

When the motor is driven again, the higher-level device outputs the enable signal of a high level along with the motor control signal at timing t13. Accordingly, the charge pump 23 is activated again at timing t13. At this time, the voltage VG of the power source terminal Tvg starts to decrease from timing t12 at which the charge pump 23 is stopped. Accordingly, since the voltage VG is lower than an inherently-necessary voltage at timing t13 at which the enable signal is input, the amplitude of the motor drive signal generated by driving the high-side MOS transistor using the voltage VG lower than the necessary voltage as the gate drive voltage gradually increases and a time is taken until the motor drive signal is stabilized. That is, when the motor is once stopped, the motor drive signal is unstable at the time of starting the drive for each re-drive. In order to avoid this situation, when the configuration in which the enable signal is held at the high level at the time of temporarily deactivating the motor and the charge pump 23 also operates in the deactivated state depending on the charge-pump clock signal of the same frequency as in the activated state is employed, it is not necessary to boost the voltage in the deactivated state, but the boosting operation is performed in the same way as in the activated state and thus the power is uselessly consumed.

On the contrary, in the DC power supply device 1 according to the first embodiment, when the motor is deactivated, the frequency of the charge-pump clock signal is lowered and the charge pump 23 operates at such a frequency at which the voltage VG is maintained as a constant voltage. Accordingly, as described above, it is possible to reduce the power consumption and it is possible to stabilize the motor drive signal, i.e., it is possible to stably drive the motor, when the deactivated state is changed to the activated state.

The first embodiment describes that a clock signal is frequency-divided into a low-frequency clock signal and a high-frequency clock signal by the use of the dividing circuit 22, but the present invention is not limited to this configuration. For example, by employing a multiplication circuit multiplying the frequency, the clock signal generated from the oscillation circuit 21 may be multiplied to generate a high-frequency clock signal and a low-frequency clock signal by the multiplication circuit and the generated clock signals may be used.

It is described above that the drive pattern decoder 44 determines whether the transistor control signal supplied from the decode/level shift circuit 11 for use in the pre-driver 12 has a pattern for supplying high power to the motor, but the present invention is not limited to this configuration. For example, it may be determined whether the motor control signal input to the control input terminal Tin or the gate voltage supplied to the high-side MOS transistor M1 has a pattern for supplying high power to the motor. The pattern may be determined on the basis of any signal as long as it can allow it to be determined whether high power should be supplied to the motor.

A second embodiment of the present invention will be described below.

Second Embodiment

Figure 9:
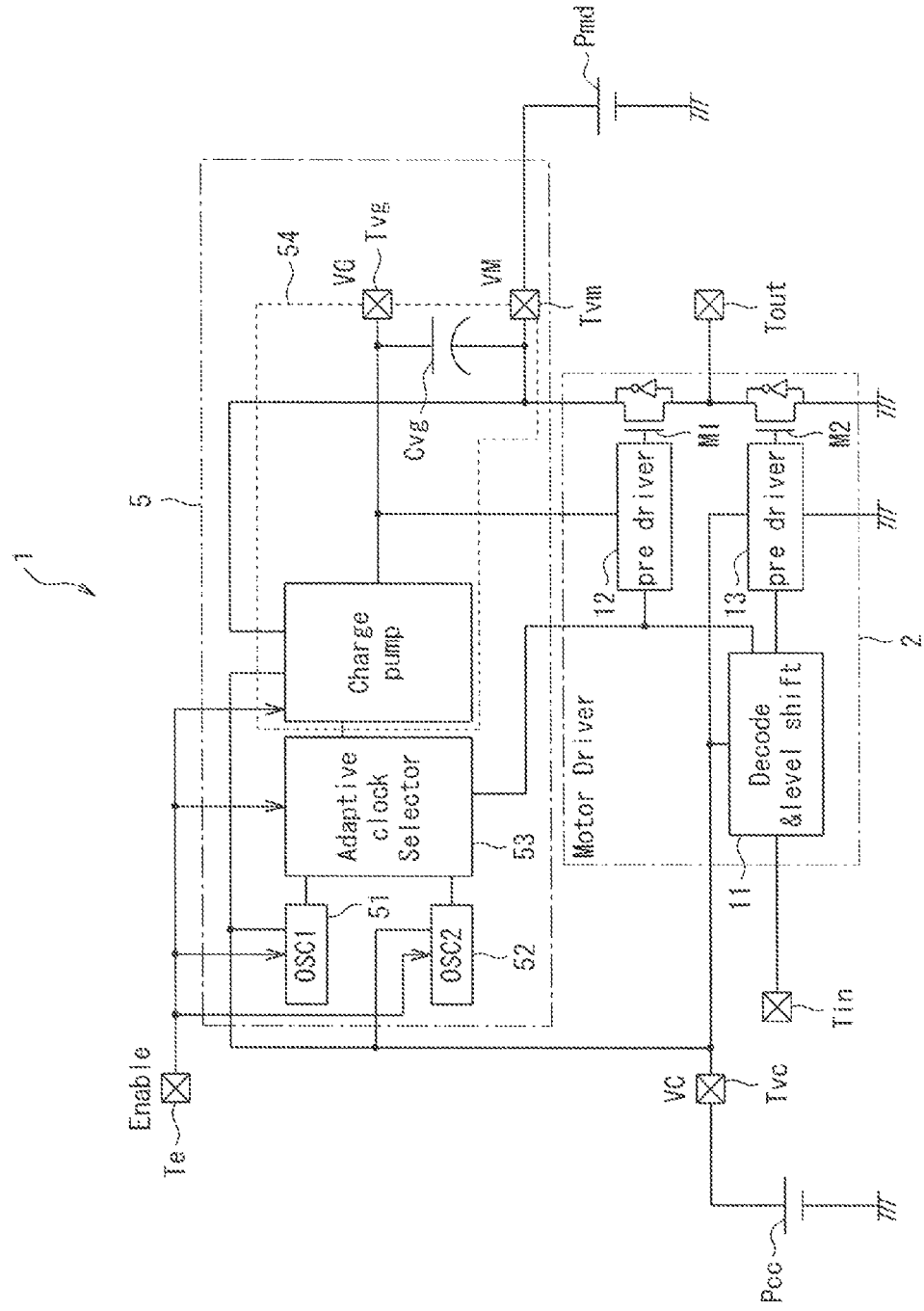
FIG. 9 is a schematic configuration diagram illustrating an example of a DC power supply device according to a second embodiment.

FIG. 9 is a schematic configuration diagram illustrating an example of a DC power supply device 1 employing a power supply circuit according to the second embodiment.

Similarly to the DC power supply device 1 shown in FIG. 1, the DC power supply device 1 shown in FIG. 9 is a motor driver and includes a motor driving circuit 2 and a power supply circuit 5. The motor driving circuit 2 is the same as the motor driving circuit 2 according to the first embodiment and thus detailed description thereof will not be repeated.

The power supply circuit 5 in the second embodiment includes a first oscillation circuit (OSC1) 51, a second oscillation circuit (OSC2) 52, a clock selection circuit (Adaptive clock Selector) 53, and a charge pump 54. The first oscillation circuit 51, the second oscillation circuit 52, the clock selection circuit 53, and the charge pump 54 receive an enable signal from a higher-level device not shown and operate when the enable signal is an enable signal indicating that a motor should be driven. The charge pump 54 performs a boosting operation in response to a charge-pump clock signal.

The first oscillation circuit 51, the second oscillation circuit 52, and the charge pump 54 are connected to the power supply terminal Tvc. The power source terminal Tvc is grounded via a power source Pcc for a circuit performing various controls in the DC power supply device 1.

The first oscillation circuit 51 generates a high-frequency clock signal of which the frequency is relatively high. The second oscillation circuit 52 generates a low-frequency clock signal of which the frequency is lower than that of the first oscillation circuit 51.

The clock selection circuit 53 receives the clock signals from the first oscillation circuit 51 and the second oscillation circuit 52 and a transistor control signal from the decode/level shift circuit 11 for use in the pre-driver 12 driving the high-side MOS transistor M1. When the transistor control signal for the pre-driver 12 has a pattern for supplying high power to the motor, the clock selection circuit 53 selects the high-frequency clock signal of the higher frequency from the first oscillation circuit 51 and outputs the selected clock signal to the charge pump 54. On the other hand, when the transistor control signal for the pre-driver 12 does not have the pattern for supplying high power to the motor, the clock selection circuit 53 selects the low-frequency clock signal of the lower frequency from the second oscillation circuit 52 and outputs the selected clock signal to the charge pump 54. The charge pump 54 has the same configuration as the charge pump 23 shown in FIG. 1.

Figure 10:
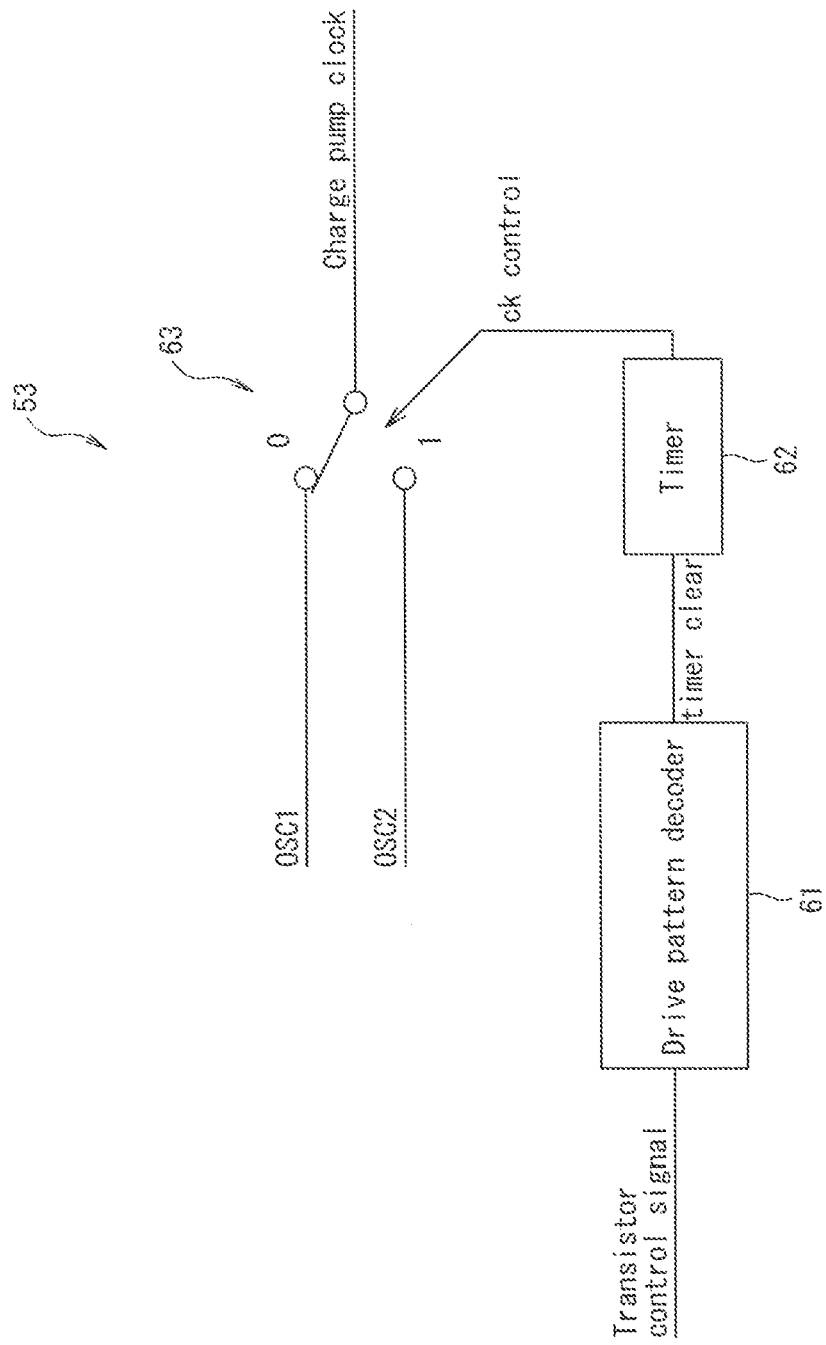
FIG. 10 is a schematic configuration diagram illustrating an example of a clock selection circuit.

FIG. 10 is a schematic configuration diagram illustrating an example of the clock selection circuit 53.

The clock selection circuit 53 includes a drive pattern decoder 61, a timer 62, and a selection switch 63.

The drive pattern decoder 61 and the timer 62 have the same functional configurations as the drive pattern decoder 44 and the timer 45 in the first embodiment.

The selection switch 63 switches a selection destination using the output signal of the timer 62 as a clock switching signal (ck control), selects the high-frequency clock signal of the higher frequency from the first oscillation circuit 51 when the output signal of the timer 62 is at a low level, and selects the low-frequency clock signal of the lower frequency from the second oscillation circuit 52 when the output signal of the timer 62 is at a high level.

Therefore, in the second embodiment, the same operational advantages as in the first embodiment can be obtained.

The above-mentioned embodiment describes that a single-phase motor is used as a load, but a multi-phase motor may be used. In this case, the motor driving circuit 2 has only to be provided to correspond to each phase. In this case, a boosted voltage VG may be supplied to the motor drivers 2 corresponding to the phases from a single power supply circuit 3, or a power supply circuit 3 may be provided for each motor driving circuit 2 and the boosted voltage VG may be supplied to the motor drivers 2 from the corresponding power supply circuits 3.

It is described above that a motor driver is applied as the DC power supply device 1, but the present invention is not limited to this configuration. The present invention can be applied to any circuit such as a DC-DC converter and a power supply coupler circuit, as long as it is a circuit including a high-side MOS transistor.

It is described in the above-mentioned embodiment that the motor driving circuit 2 including the high-side MOS transistor M1 and the low-side MOS transistor M2 is used, but the motor driver does not have to include the low-side MOS transistor M2 and a motor driver not including the low-side MOS transistor M2 may be used.

It is described in the above-mentioned embodiment that the power supply capability is switched to two steps by switching the frequency of the charge-pump clock signal between a high frequency and a low frequency, but the present invention is not limited to this configuration. Plural timers which count different lengths of period or a timer which counts variable length of period may be provided and the power supply capability may be switched to three or more steps or may be continuously switched, depending on the magnitude of the supplied voltage required for the driving situation of a load.

In the first and second embodiments, the drive pattern decoders 44 and 61 determine whether the transistor control signal for the pre-driver 12 has a drive pattern for supplying high power to the motor, i.e., whether the pulse width is large or whether the number of pulses per unit time is large. However, the drive pattern decoders 44 and 61 may determine whether the transistor control signal for the pre-driver 12 has a drive pattern for driving the motor, i.e., whether the pulse width is zero or whether the number of pulses per unit time is zero.

That is, in the first and second embodiments, for example, when the pulse width is equal to or more than a threshold value or when the number of pulses per unit time is equal to or more than a threshold value, it is determined that the transistor control signal has a pattern for supplying high power to the motor. On the contrary, when the pulse width is less than the threshold value or when the number of pulses per unit time is less than the threshold value, it is determined that the transistor control signal has a pattern for supplying low power to the motor. However, for example, when the pulse width is larger than zero or when the number of pulses per unit time is larger than zero, it may be determined that the transistor control signal has the pattern for driving the motor. On the contrary, when the pulse width is zero or when the number of pulses per unit time is zero, it may be determined that the transistor control signal has the pattern for deactivating the motor.

That is, the threshold value may be set to zero.

In this case, the oscillation circuit 21 and the dividing circuit 22 set the power supply capability of the charge pump 23 to be large when the motor is activated, the oscillation circuit 21 and the dividing circuit 22 set the power supply capability of the charge pump 23 to be small when the motor is deactivated.

A third embodiment of the present invention will be described below.

Third Embodiment

Figure 11:
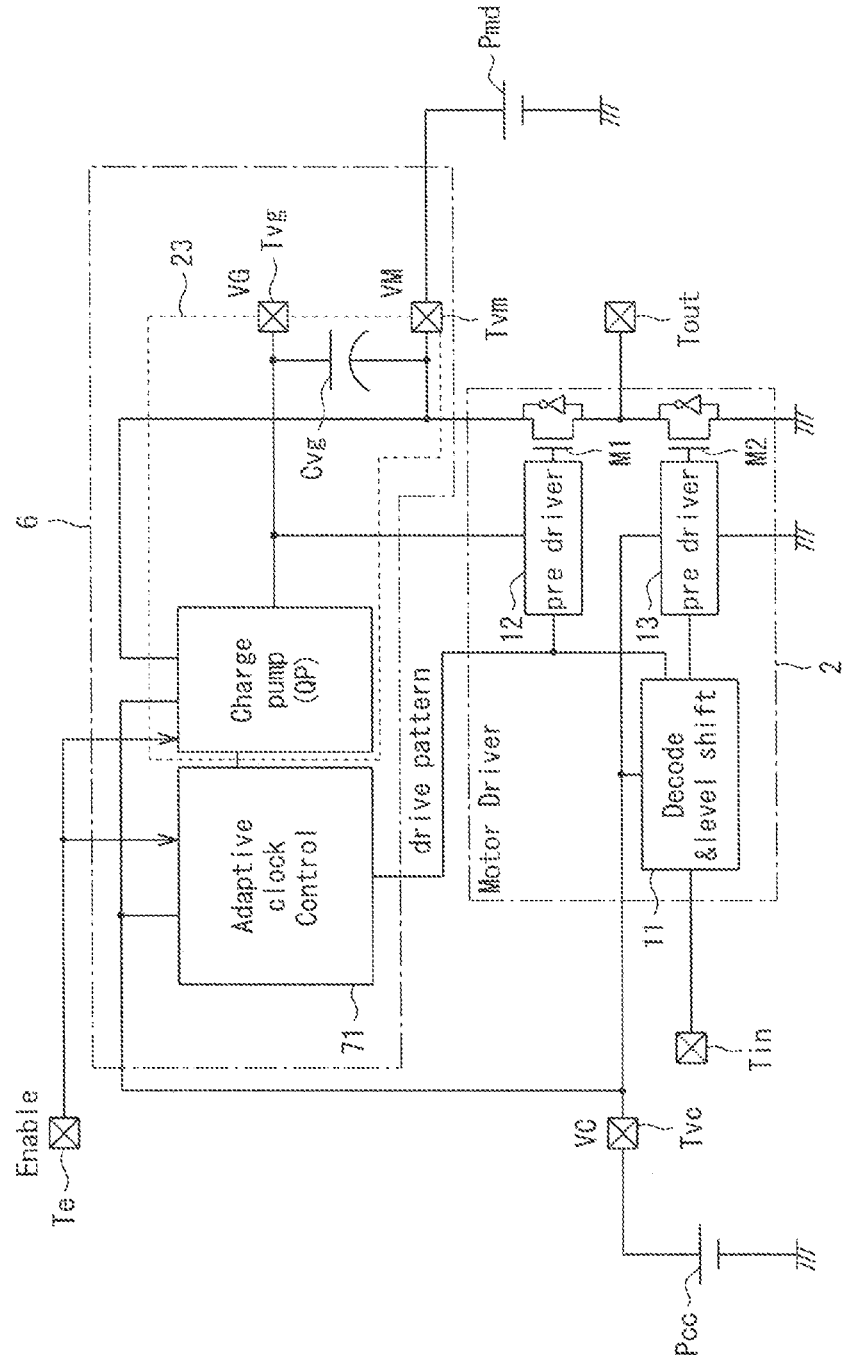
FIG. 11 is a schematic configuration diagram illustrating an example of a DC power supply device according to a third embodiment.

FIG. 11 is a schematic configuration diagram illustrating an example of a DC power supply device 1 employing a power supply circuit according to the third embodiment.

Similarly to the DC power supply device 1 shown in FIG. 1, the DC power supply device 1 shown in FIG. 11 is a motor driver and includes a motor driving circuit 2 and a power supply circuit 6. The motor driving circuit 2 is the same as the motor driving circuit 2 according to the first embodiment and thus detailed description thereof will not be repeated.

The power supply circuit 6 in the third embodiment includes a clock controlling circuit (Adaptive clock Control) 71 and a charge pump 23. The clock controlling circuit 71 and the charge pump 23 receive an enable signal from a higher-level device not shown and operate when the enable signal is an enable signal indicating that a motor should be driven. The charge pump 23 performs a boosting operation in response to a charge-pump clock signal.

The clock controlling circuit 71 and the charge pump 23 are connected to the power source terminal Tvc. The power source terminal Tvc is grounded via a power source Pcc for a circuit performing various controls in the DC power supply device 1.

The clock controlling circuit 71 receives a transistor control signal from the decode/level shift circuit 11 for use in the pre-driver 12 driving the high-side MOS transistor M1. When the transistor control signal for the pre-driver 12 has a pattern for supplying high power to the motor, the clock controlling circuit 71 outputs the high-frequency clock signal of the higher frequency to the charge pump 23. On the other hand, when the transistor control signal for the pre-driver 12 does not have the pattern for supplying high power to the motor, the clock controlling circuit 71 outputs the low-frequency clock signal of the lower frequency to the charge pump 23.

Figure 12:
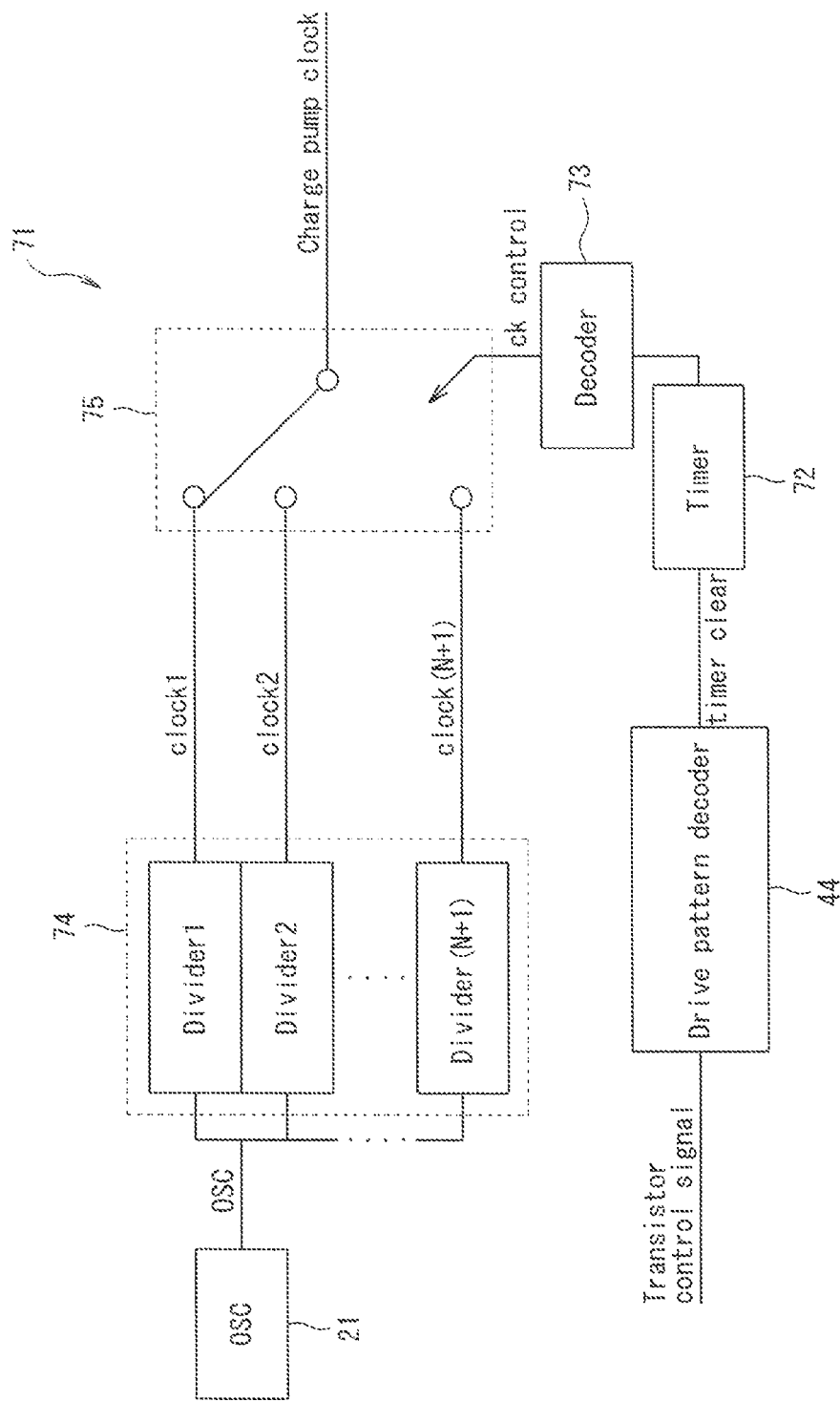
FIG. 12 is a schematic configuration diagram illustrating an example of a clock controlling circuit.

FIG. 12 is a schematic configuration diagram illustrating an example of the clock controlling circuit 71.

The clock controlling circuit 71 includes an oscillation circuit 21, a drive pattern decoder 44, a timer 72, a decoder 73, a divider 74, and a selection switch 75.

The divider 74 includes plural dividers (Divider1 to Divider(N+1)) having different dividing ratios, and dividers (Divider1 to Divider(N+1)) perform frequency-dividing the clock signal generated from the oscillation circuit 21 at predetermined dividing ratios and output the divided clock signals as clock signals clock1 to clock(N+1).

The drive pattern decoder 44 has the same function as the drive pattern decoder 44 in the first embodiment and determines whether the transistor control signal for the pre-driver 12 has a drive pattern for supplying high power to the motor, i.e., whether the pulse width is large or whether the number of pulses per unit time is large. The drive pattern decoder 44 outputs a high-level signal when the transistor control signal has the drive pattern for supplying high power, and outputs a low-level signal when the transistor control signal has the drive pattern for supplying low power.

The timer 72 counts the elapsed time and outputs the elapsed time, i.e., the counted signal, to the decoder 73. When the counted value of the timer 72 reaches a predetermined upper limit, i.e., when a predetermined time elapses, a clock control signal of a high level is output. The timer 72 uses the output signal of the drive pattern decoder 44 as a timer clear signal. That is, when a high-level signal is input from the drive pattern decoder 44, i.e., when it is determined that the transistor control signal has the pattern for supplying high power, the timer 72 is reset.

In this way, the timer 72 counts, for example, a period in which the output signal of the drive pattern decoder 44 is at a low level, outputs the count signal, and outputs a clock control signal of a high level when the period in which the output signal is at the low level reaches a predetermined upper limit of the timer 72.

The decoder 73 determines the magnitude of the count signal from the timer 72 and outputs a clock switching signal (ck control) corresponding to the magnitude of the count signal of the timer 72.

The selection switch 75 selects a clock signal corresponding to the clock switching signal (ck control) from the decoder 73 out of the clock signals clock1 to clock(N+1) output from the divider 74 and outputs the selected clock signal as a charge-pump clock signal. Specifically, the selection switch 75 selects a high-frequency clock signal (clock1) from the divider outputting a higher frequency clock when the count signal of the timer 72 is small, and selects a low-frequency clock signal (clock2 to clock(N+1)) from the divider outputting a lower frequency clock as the count signal of the timer 72 becomes larger.

FIG. 13 shows a relationship between the count signal (Timer) output from the timer 72 and the clock signal clock1 to clock(N+1) output from the divider 74, i.e., the charge-pump clock signal. In the drawing, T1 to T(N+1) are set to any time satisfying T1<T2<T3< . . . <T(N+1), and the frequency relationship of the clock signals clock1 to clock (N+1) output from the divider 74 is set to clock1>clock2> . . . >clock(N+1). By selecting the clock signal on the basis of the relationship shown in FIG. 13 depending on the count signal of the timer 72, i.e., the elapsed time, a slower clock signal is selected and is output as the charge-pump clock signal when the count signal of the timer 72 becomes larger.

Figure 14:
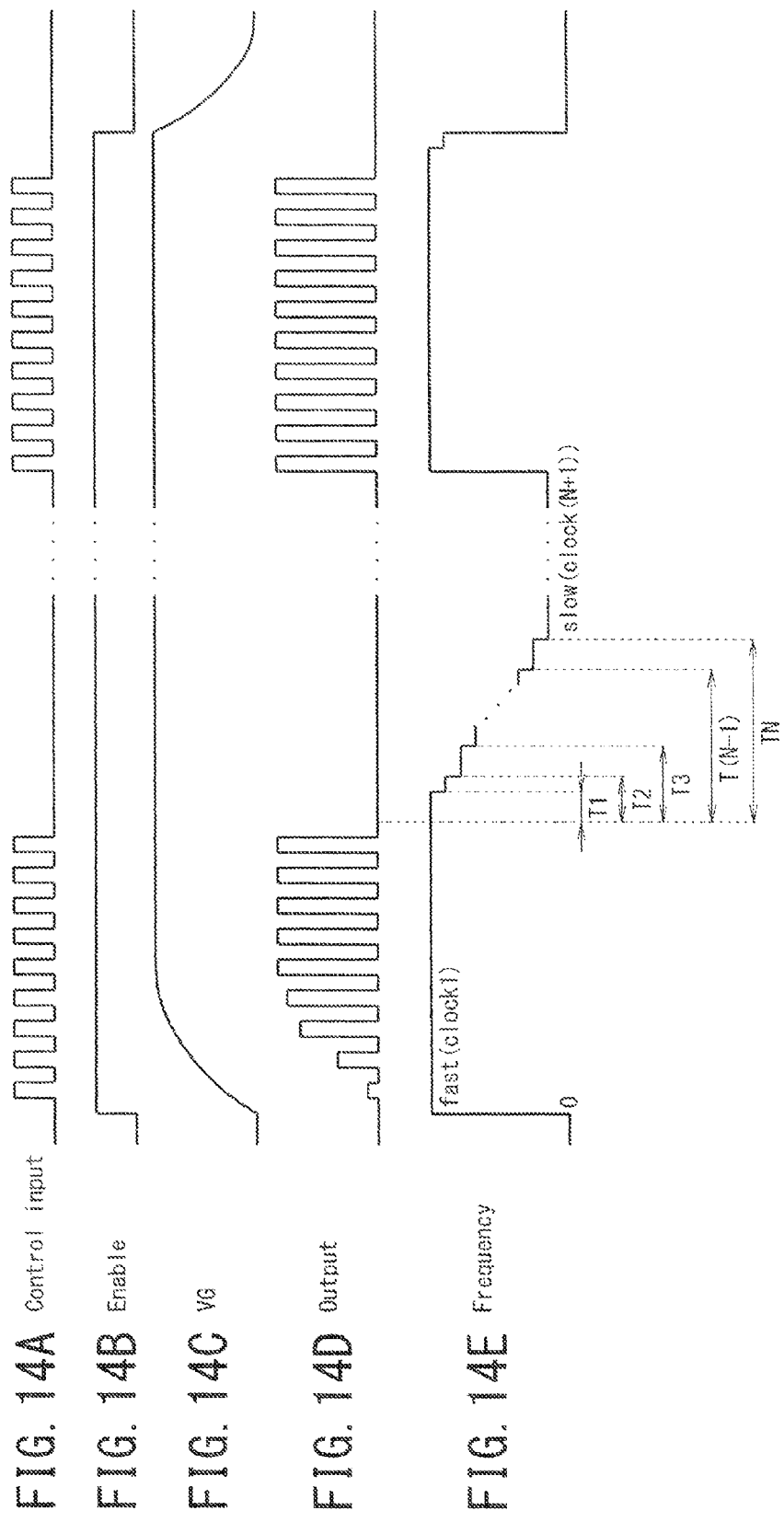
FIGS. 14A to 14E are timing diagrams illustrating examples of signals at the parts of the DC power supply device according to the third embodiment.

FIGS. 14A to 14E are timing diagrams illustrating the signals at the parts of the DC power supply device 1 shown in FIG. 11, where FIG. 14A shows the motor control signal including a pulse signal corresponding to the rotation amount of the motor, FIG. 14B shows the enable signal, FIG. 14C shows the voltage VG of the power source terminal Tvg, FIG. 14D shows the motor drive signal output from the output terminal Tout, and FIG. 14E shows the frequency level of the clock signal supplied to the charge pump 23.

As shown in FIGS. 14A to 14E, when the power supplied to the motor is high, the output signal of the drive pattern decoder 44 is frequently switched to a high level and thus the timer 72 is frequently reset. Accordingly, since the count signal output from the timer 72 holds a relatively-small value and satisfies Timer<T1, the clock signal clock1 is specified from FIG. 13. Accordingly, the clock switching signal (ck control) for selecting the clock signal clock1 is output from the decoder 73, and the clock signal clock1 output from the divider (Divider1) is selected and output as the charge-pump clock signal by the selection switch 75.

In order to deactivate the motor in this state, when the motor control signal from the higher-level device holds a low level and no pulse is generated, the drive pattern decoder 44 determines that the transistor control signal has the pattern for supplying low power to the motor and thus the output signal of the drive pattern decoder 44 holds a low level. Accordingly, the count signal of the timer 72 becomes larger, and the clock signal clock2 is specified from FIG. 13 when the count signal satisfies T1≤Timer<T2. Accordingly, the clock switching signal (ck control) for selecting the clock signal clock2 is output from the decoder 73, and the clock signal clock2 output from the divider (Divider2) is selected and output as the charge-pump clock signal as a result.

When the count signal becomes larger and satisfies T2≤Timer<T3, the clock signal clock3 is selected. Thereafter, when the count signal (Timer) becomes larger, a clock signal of a lower frequency is selected. When the count signal satisfies TN≤Timer, the clock signal clock(N+1) (SLOW) of the lowest frequency is selected and output as the charge-pump clock signal.

Therefore, in the third embodiment, the same operational advantages as in the first and second embodiments can be achieved.

In the third embodiment, since plural clock signals are switched and used depending on the magnitude of the count signal, it is possible to more finely control the power consumption depending on the drive pattern for driving the motor and thus to further reduce the power consumption of the power supply circuit.

The third embodiment describes that a single-phase motor is used as a load, but a multi-phase motor may be used. In this case, the motor driving circuit 2 has only to be provided to correspond to each phase. In this case, a boosted voltage VG may be supplied to the motor drivers 2 corresponding to the phases from a single power supply circuit 6, or a power supply circuit 6 may be provided for each motor driving circuit 2 and the boosted voltage VG may be supplied to the motor drivers 2 from the corresponding power supply circuits 6.

It is described above that a motor driver is applied as the DC power supply device 1, but the present invention is not limited to this configuration. The present invention can be applied to any circuit such as a DC-DC converter and a power supply coupler circuit, as long as it is a circuit including a high-side MOS transistor.

It is described in the third embodiment that the motor driving circuit 2 including the high-side MOS transistor M1 and the low-side MOS transistor M2 is used, but the motor driver does not have to include the low-side MOS transistor M2 and a motor driver not including the low-side MOS transistor M2 may be used.

In the third embodiment, the drive pattern decoder 44 determines whether the transistor control signal for the pre-driver 12 has a drive pattern for supplying high power to the motor, i.e., whether the pulse width is large or whether the number of pulses per unit time is large. However, the drive pattern decoder 44 may determine whether the transistor control signal for the pre-driver 12 has a drive pattern for driving the motor, i.e., whether the pulse width is zero or whether the number of pulses per unit time is zero.

That is, in the third embodiment, for example, when the pulse width is equal to or more than a threshold value or when the number of pulses per unit time is equal to or more than a threshold value, it is determined that the transistor control signal has a pattern for supplying high power to the motor. On the contrary, when the pulse width is less than the threshold value or when the number of pulses per unit time is less than the threshold value, it is determined that the transistor control signal has a pattern for supplying low power to the motor. However, for example, when the pulse width is larger than zero or when the number of pulses per unit time is larger than zero, it may be determined that the transistor control signal has the pattern for driving the motor. On the contrary, when the pulse width is zero or when the number of pulses per unit time is zero, it may be determined that the transistor control signal has the pattern for deactivating the motor. That is, the threshold value may be set to zero.

Figure 15:
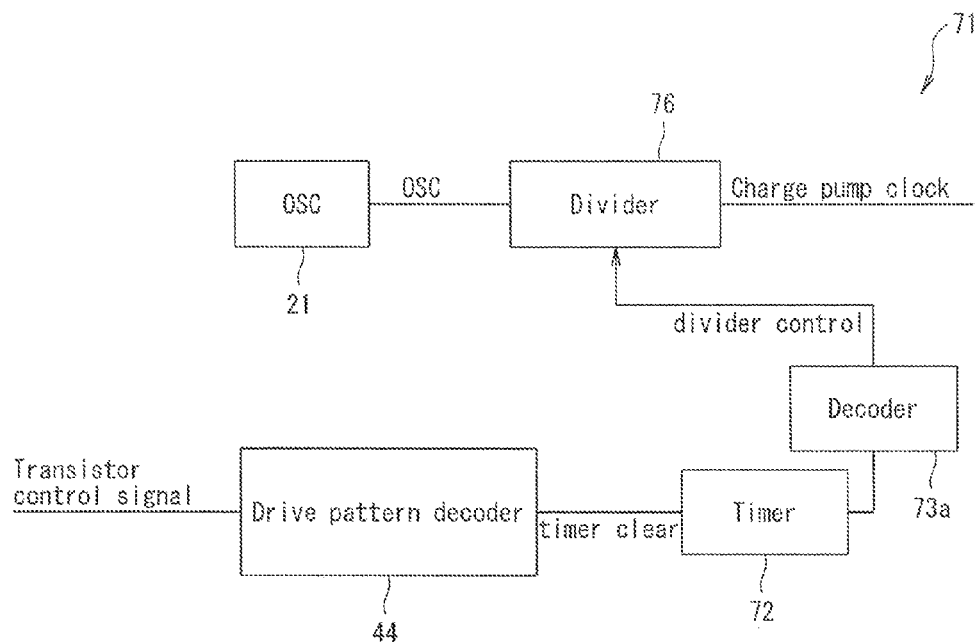
FIG. 15 is a schematic configuration diagram illustrating another example of the adaptive clock controlling circuit.

FIG. 15 is a schematic configuration diagram illustrating another example of the clock controlling circuit 71.

The clock controlling circuit 71 includes an oscillation circuit 21, a drive pattern decoder 44, a timer 72, a decoder 73a, and a divider 76.

The divider 76 switches the dividing ratio depending on a dividing ratio switching signal (divider control) from the decoder 73a and performs frequency-dividing the clock signal generated from the oscillation circuit 21. Specifically, the divider 76 outputs a high-frequency clock signal of a higher dividing ratio when the count signal of the timer 72 is small, and outputs a low-frequency clock signal of a lower dividing ratio when the count signal of the timer 72 becomes larger.

The decoder 73a determines the dividing ratio depending on the count signal from the timer 72 and outputs the determined dividing ratio as the dividing ratio switching signal (divider control) to the divider 76.

The oscillation circuit 21, the drive pattern decoder 44, and the timer 72 have the same functions of the constituent units shown in FIG. 11.

FIG. 16 shows a relationship between the count signal (Timer) of the timer 72 and the dividing ratio set in the divider 76, i.e., the dividing ratio for generating the charge-pump clock signal. In the drawing, T1 to TN are set to any time satisfying T1<T2<T3< . . . <TN, and the dividing ratio of the divider 76 is set to any value satisfying x1<x2< . . . <x(n+1). By selecting the dividing ratio on the basis of the relationship shown in FIG. 16 depending on the magnitude of the count signal, a larger dividing ratio is selected with an increase of the count signal, i.e., the elapsed time, of the timer 72 and the low-frequency clock signal of a lower frequency is output as the charge-pump clock signal from the divider 76 when the count signal of the timer 72 becomes larger.

That is, in this case, as the count signal of the timer 72 becomes larger, the frequency becomes lower. Accordingly, the same operational advantages as in the third embodiment can be achieved.

Figure 17:
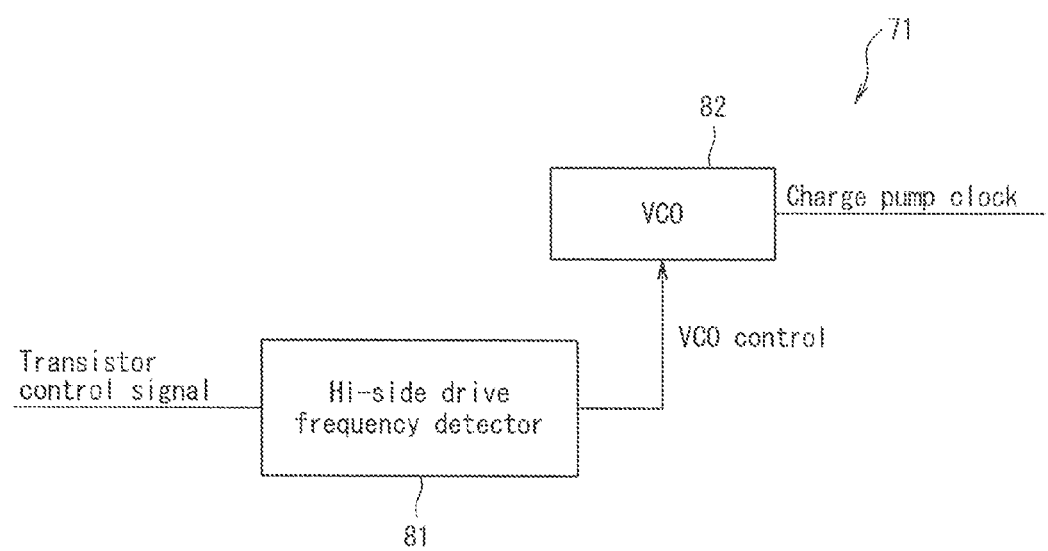
FIG. 17 is a schematic configuration diagram illustrating another example of the clock controlling circuit.

FIG. 17 is a schematic configuration diagram illustrating another example of the clock controlling circuit 71.

The clock controlling circuit 71 shown in FIG. 17 includes a voltage-controlled oscillator circuit (VCO) 82 and a drive pattern frequency meter (Hi-side drive frequency detector) 81.

The voltage-controlled oscillator circuit 82 generates a clock signal of a frequency corresponding to the VCO control signal (VCO control) from the drive pattern frequency meter 81.

The drive pattern frequency meter 81 outputs a VCO control signal causing the output signal of the voltage-controlled oscillator circuit 82 to be a high-frequency clock signal of a higher frequency when the transistor control signal for driving the high-side MOS transistor M1 has the drive pattern for supplying higher power to the motor, i.e., when the frequency of the transistor control signal becomes higher.

Accordingly, a clock signal of a higher frequency is generated and output as the charge-pump clock signal by the voltage-controlled oscillator circuit 82 when the transistor control signal has the drive pattern for supplying higher power to the motor, and a clock signal of a lower frequency is generated and output as the charge-pump clock signal by the voltage-controlled oscillator circuit 82 when the transistor control signal has the drive pattern for supplying lower power to the motor. Accordingly, in this case, the same operational advantages as in the third embodiment can also be achieved.

Figure 18:
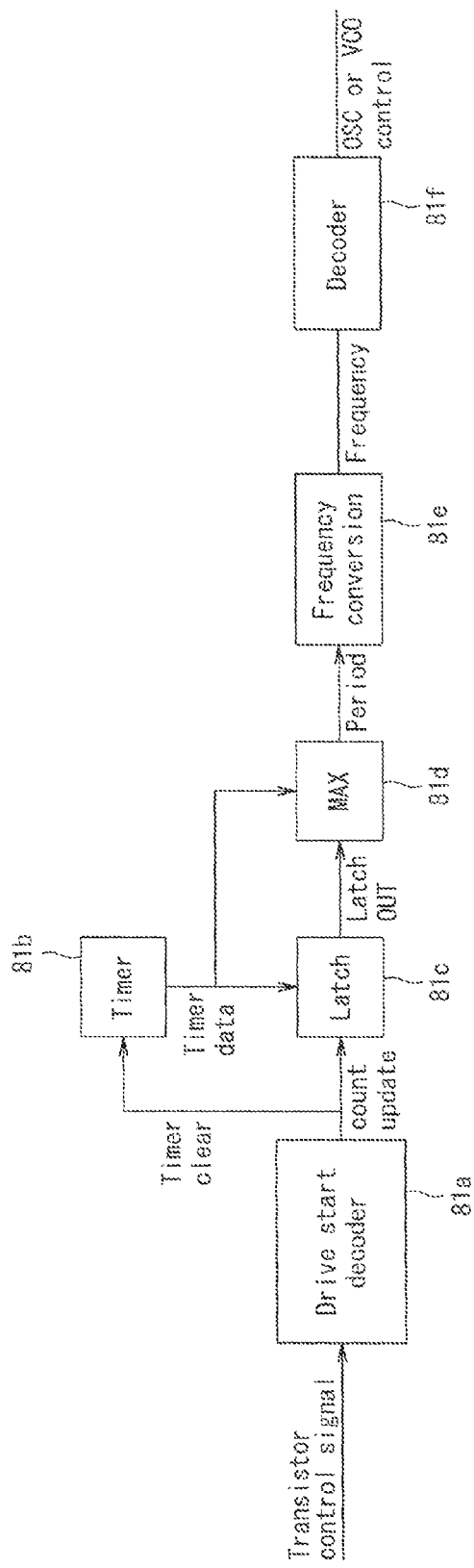
FIG. 18 is a schematic configuration diagram illustrating an example of a drive pattern frequency meter.

FIG. 18 is a schematic configuration diagram illustrating an example of the drive pattern frequency meter 81. The drive pattern frequency meter 81 has the same functional configuration as a drive pattern frequency meter 83 to be described later.

The drive pattern frequency meter 81 includes a drive start determining decoder (Drive start decoder) 81a, a timer 81b, a latch circuit (Latch) 81c, a maximum value selector circuit (MAX) 81d, a frequency conversion unit (Frequency Conversion) 81e, and a decoder 81f.

FIGS. 19A to 19F are timing diagrams illustrating the signals at the parts of the drive pattern frequency meter 81. FIG. 19A shows the transistor control signal, FIG. 19B shows the output of the drive start determining decoder 81a as a count update signal input to the latch circuit 81c, FIG. 19C shows the output of the drive start determining decoder 81a as the Timer clear signal for resetting the timer 81b, FIG. 19D shows Timer data output from the timer 81b, FIG. 19E shows a latch output (Latch OUT) which is the output of the latch circuit 81c, and FIG. 19F shows a period signal (Period) output from the maximum value selector circuit 81d.

The drive start determining decoder 81a receives the transistor control signal and outputs a pulse at the rising timing of the transistor control signal as shown in FIGS. 19A to 19C.

The timer 81b serves to count the period of the transistor control signal and serves as a timer counting time when it is implemented in a digital circuit. That is, the timer 81b receives the output of the drive start determining decoder 81a as a Timer clear signal, and resets the timer value and restarts the counting whenever receiving the Timer clear signal. The Timer data signal which is the output of the timer 81b is input to the latch circuit 81c and the maximum value selector circuit 81d.

The latch circuit 81c receives the Count update signal from the drive start determining decoder 81a and the Timer data from the timer 81b, latches the Timer data at the timing at which the Count update signal is switched to a high level, and outputs the latched Timer data as the latch output (LatchOUT).

The maximum value selector circuit 81d receives the Timer data signal from the timer 81b and the latch output from the latch circuit 81c and outputs the larger one of the Timer data signal and the latch output as the period signal (Period).

The frequency conversion unit 81e converts the period signal output from the maximum value selector circuit 81d into frequency data (Frequency). The decoder 81f converts the frequency data converted by the frequency conversion unit 81e into a VCO control signal (VCO control) for the voltage-controlled oscillator circuit 82. The decoder 81f converts the frequency data converted by the frequency conversion unit 81e into the frequency control signal (OSC frequency control) for the variable frequency oscillator (OSC) in case of the drive pattern frequency meter 83 to be described later.

By employing this configuration, as shown in FIG. 19, when the transistor control signal has the drive pattern for supplying higher power to the motor, the timer 81b is more frequently reset and the Timer data has a smaller value. Accordingly, the period signal has a relatively-small value and the frequency data has a relatively-high frequency. As a result, the decoder 81f outputs the VCO control signal with a clock signal of a higher frequency as the charge-pump clock signal.

When the transistor control signal has the drive pattern for supplying lower power to the motor, the reset interval of the timer 81b increases. Accordingly, the Timer data increases, the period signal increases, and the frequency data has a lower frequency. As a result, the decoder 81f outputs the VCO control signal with a clock signal of a lower frequency as the charge-pump clock signal.

Without using the frequency conversion unit 81e, the period signal (Period) output from the maximum value selector circuit 81d may be directly converted into the VCO control signal (or the frequency control signal) by the decoder 81f.

FIG. 20 is a schematic configuration diagram illustrating another example of the clock controlling circuit 71.

The clock controlling circuit 71 includes a variable frequency oscillator (OSC) 84 and a drive pattern frequency meter (Hi-side drive frequency detector) 83.

The variable frequency oscillator 84 generates a clock signal of an oscillation frequency corresponding to the frequency control signal (OSC frequency control) output from the drive pattern frequency meter 83.

The drive pattern frequency meter 83 has the same functional configuration as the drive pattern frequency meter 81 shown in FIG. 17. The drive pattern frequency meter 83 outputs the frequency control signal causing the variable frequency oscillator 84 to output a high-frequency clock signal of a higher frequency when the transistor control signal for driving the high-side MOS transistor M1 has the drive pattern for supplying higher power to the motor, i.e., when the frequency of the transistor control signal becomes higher. The drive pattern frequency meter 83 outputs the frequency control signal causing the variable frequency oscillator 84 to output a low-frequency clock signal of a lower frequency when the frequency of the transistor control signal becomes lower.

Accordingly, when the transistor control signal has the drive pattern for supplying higher power to the motor, a higher-frequency clock signal is generated and output as the charge-pump clock signal by the variable frequency oscillator 84. On the contrary, when the transistor control signal has the drive pattern for supplying lower power to the motor, a lower-frequency clock signal is generated and output as the charge-pump clock signal by the variable frequency oscillator 84. Accordingly, in this case, the same operational advantages as in the third embodiment can also be achieved.

The scope of the present invention is not limited to the illustrated and described embodiments, but includes all embodiments causing advantages equivalent to the object of the present invention. The scope of the present invention is not limited to the combinations of the features of the invention defined in the appended claims, but can be defined by all desired combinations of specific features out of all the described features.

REFERENCE SIGNS LIST

1: DC power supply device
2: motor driving circuit
3, 5: power supply circuit
11: decode/level shift circuit
12, 13: pre-driver
21: oscillation circuit
22: dividing circuit
23: charge pump
41: first divider
42: second divider
43: selection switch
44: drive pattern decoder
45: timer
51: first oscillation circuit
52: second oscillation circuit
53: clock selection circuit
54: charge pump
61: drive pattern decoder
62: timer
63: selection switch
71: clock controlling circuit
72: timer
73: decoder
74: divider
75: selection switch
76: divider
81: drive pattern frequency meter
82: voltage-controlled oscillator circuit
83: drive pattern frequency meter
84: variable frequency oscillator

The invention claimed is:
1. A power supply circuit comprising:
a transistor configured to turn on and off a voltage supplied to a load;
a booster circuit configured to boost a voltage of input power and supplies the power of which the voltage is boosted as power for driving the transistor; and
a power supply capability switching circuit configured to switch power supply capability of the booster circuit depending on the number of pulses per unit time of a load control signal that controls on and off of the transistor, wherein the power supply capability switching circuit includes a drive pattern decoder that determines a drive pattern for the load control signal, and the booster circuit is controlled based on the drive pattern without directly specifying an operation mode of the boost circuit.

2. The power supply circuit according to claim 1, wherein the power supply capability switching circuit is configured to switch the power supply capability so as to set the power supply capability to be lower when the load control signal indicates that an amount of power supplied to the load is smaller.

3. The power supply circuit according to claim 2, wherein the power supply capability switching circuit is configured to output a power-supply-capability-switching clock signal having a frequency corresponding to the load control signal, and
wherein the frequency of the power-supply-capability-switching clock signal is lower when the load control signal indicates that the amount of power supplied to the load is smaller.

4. The power supply circuit according to claim 2, wherein the power supply capability switching circuit is configured to output a first clock signal of which the frequency is a first frequency as the power-supply-capability-switching clock signal when the load control signal indicates that the amount of power supplied to the load is equal to or more than a threshold value, and to output a second clock signal of which the frequency is a second frequency lower than the first frequency as the power-supply-capability-switching clock signal when the load control signal indicates that the amount of power supplied to the load is less than the threshold value.

5. The power supply circuit according to claim 4, wherein the power supply capability switching circuit includes:
an oscillation circuit configured to generate a third clock signal; and
a frequency converter circuit configured to convert the frequency of the third clock signal into the first frequency and the second frequency to generate the first clock signal and the second clock signal,
wherein the frequency converter circuit is configured to generate the first clock signal when the load control signal indicates that the amount of power supplied is equal to or more than the threshold value, and to generate the second clock signal when the load control signal indicates that the amount of power supplied is less than the threshold value.

6. The power supply circuit according to claim 4, wherein the power supply capability switching circuit includes:
a first oscillation circuit configured to generate the first clock signal;
a second oscillation circuit configured to generate the second clock signal; and
a selection circuit configured to select the first oscillation circuit to output the first clock signal when the load control signal indicates that the amount of power supplied is equal to or more than the threshold value, and to select the second oscillation circuit to output the second clock signal when the load control signal indicates that the amount of power supplied is less than the threshold value.

7. The power supply circuit according to claim 4, wherein the threshold value is zero.

8. The power supply circuit according to claim 3, wherein the power supply capability switching circuit includes:
an oscillation circuit configured to generate a third clock signal;
a divider configured to perform frequency-dividing the third clock signal at different dividing ratios to generate a plurality of clock signals having different frequencies; and
a selection unit configured to select the clock signal having the frequency corresponding to the load control signal out of the plurality of clock signals generated by the divider as the power-supply-capability-switching clock signal,
wherein the selection unit is configured to select the clock signal having a lower frequency when the load control signal indicates that the amount of power supplied to the load is smaller.

9. The power supply circuit according to claim 3, wherein the power supply capability switching circuit includes:
an oscillation circuit configured to generate a third clock signal; and
a divider configured to perform frequency-dividing the third clock signal to generate the power-supply-capability-switching clock signal,
wherein the divider is configured to switch the dividing ratio to a dividing ratio for lowering the frequency when the load control signal indicates that the amount of power supplied to the load is smaller.

10. The power supply circuit according to claim 3, wherein the booster circuit is a charge pump circuit configured to boost the voltage of the input power depending on the power-supply-capability-switching clock signal.

11. The power supply circuit according to claim 1, further comprising a load driving circuit that drives the load by controlling the transistor on the basis of the load control signal.

12. The power supply circuit according to claim 11, wherein the transistor is inside the load driving circuit.

13. The power supply circuit according to claim 1, wherein the transistor is connected in series to at least one additional transistor.

14. The power supply circuit according to claim 1, wherein the load is a motor connected to an output terminal.

15. The power supply circuit according to claim 1, wherein the load control signal is inputted by a control input terminal.

16. A power supply circuit comprising:
a transistor configured to turn on and off a voltage supplied to a load;
a booster circuit configured to boost a voltage of input power and supplies the power of which the voltage is boosted as power for driving the transistor; and
a power supply capability switching circuit configured to switch power supply capability of the booster circuit depending on a result of comparing a threshold value and a pulse width of a load control signal that controls on and off of the transistor,
wherein the power supply capability switching circuit includes a drive pattern decoder that determines a drive pattern for the load control signal, and the booster circuit is controlled based on the drive pattern without directly specifying an operation mode of the boost circuit.

* * * * *